US012075836B2

(12) United States Patent
Liu et al.

(10) Patent No.: US 12,075,836 B2
(45) Date of Patent: Sep. 3, 2024

(54) ATOMIZING SHEET ASSEMBLY, ATOMIZER AND ELECTRONIC CIGARETTE

(71) Applicant: CHINA TOBACCO HUNAN INDUSTRIAL CO., LTD., Hunan (CN)

(72) Inventors: Jianfu Liu, Hunan (CN); Kejun Zhong, Hunan (CN); Xiaoyi Guo, Hunan (CN); Wei Huang, Hunan (CN); Xinqiang Yin, Hunan (CN); Jianhua Yi, Hunan (CN); Yongquan Zhou, Hunan (CN)

(73) Assignee: CHINA TOBACCO HUNAN INDUSTRIAL CO., LTD., Hunan (CN)

( * ) Notice: Subject to any disclaimer, the term of this patent is extended or adjusted under 35 U.S.C. 154(b) by 555 days.

(21) Appl. No.: 17/414,936

(22) PCT Filed: Dec. 18, 2019

(86) PCT No.: PCT/CN2019/126244
§ 371 (c)(1),
(2) Date: Jun. 16, 2021

(87) PCT Pub. No.: WO2020/125666
PCT Pub. Date: Jun. 25, 2020

(65) Prior Publication Data

US 2022/0046993 A1 Feb. 17, 2022

(30) Foreign Application Priority Data

Dec. 18, 2018 (CN) ......................... 201811548248.6
Dec. 18, 2018 (CN) ......................... 201811548264.5
Dec. 18, 2018 (CN) ......................... 201822129910.6

(51) Int. Cl.
*A24F 40/10* (2020.01)
*A24F 7/00* (2006.01)
(Continued)

(52) U.S. Cl.
CPC .............. *A24F 40/485* (2020.01); *A24F 7/00* (2013.01); *A24F 40/05* (2020.01); *A24F 40/10* (2020.01); *A24F 40/49* (2020.01); *B05B 17/0676* (2013.01)

(58) Field of Classification Search
CPC ........ A24F 40/05; A24F 40/10; A24F 40/485; A24F 40/49; A24F 7/00; B05B 17/0676
See application file for complete search history.

(56) References Cited

U.S. PATENT DOCUMENTS

2019/0116872 A1* 4/2019 Qiu .......................... A24D 3/18
2019/0191781 A1* 6/2019 Lin .......................... H05B 3/00
2020/0315251 A1* 10/2020 Ding ....................... A24F 40/46

FOREIGN PATENT DOCUMENTS

CN 205658373 U 10/2016
CN 206025225 U 3/2017
(Continued)

OTHER PUBLICATIONS

International Search Report issued in International Application No. PCT/CN2019/126244 dated Mar. 18, 2020, 3 pages.

*Primary Examiner* — Abdullah A Riyami
*Assistant Examiner* — Thang H Nguyen
(74) *Attorney, Agent, or Firm* — MASCHOFF BRENNAN; Ran Pang; Michael Mauriel

(57) ABSTRACT

An atomizing sheet assembly, an atomizer, and an electronic cigarette are disclosed. The atomizing sheet assembly comprises an e-liquid guide member, an atomizing sheet, and an atomizing seat. The atomizing sheet is fixed on the atomizing seat. The e-liquid guide member is in contact with an
(Continued)

atomizing surface of the atomizing sheet. The atomizing seat is made of an elastic material. The e-liquid guide member is flaky. The atomizing seat is provided with a through hole. The flaky e-liquid guide member passes through the through hole and is in contact with the atomizing sheet. The atomizing sheet assembly can effectively adjust the e-liquid guide rate.

17 Claims, 19 Drawing Sheets

(51) Int. Cl.

| | |
|---|---|
| ***A24F 40/05*** | (2020.01) |
| ***A24F 40/485*** | (2020.01) |
| ***A24F 40/49*** | (2020.01) |
| ***B05B 17/06*** | (2006.01) |

(56) References Cited

FOREIGN PATENT DOCUMENTS

| | | | | |
|---|---|---|---|---|
| CN | 206586397 | * | 10/2017 | ............. A24F 47/00 |
| CN | 206586397 | U | 10/2017 | |
| CN | 206620837 | U | 11/2017 | |
| CN | 207185932 | U | 4/2018 | |
| CN | 108142998 | A | 6/2018 | |
| CN | 108618209 | A | 10/2018 | |
| CN | 209463299 | U | 10/2019 | |
| KR | 20100097807 | A | 9/2010 | |
| KR | 20180129883 | A | 12/2018 | |
| WO | 2018095312 | A1 | 5/2018 | |

* cited by examiner

ATOMIZING SHEET ASSEMBLY, ATOMIZER AND ELECTRONIC CIGARETTE

CROSS REFERENCE TO RELATED APPLICATIONS

This application is a U.S. National Phase application under 35 U.S.C. § 371 of International Application No. PCT/CN2019/126244 filed on Dec. 18, 2019, which claims priority to Chinese Application No. 201811548264.5 filed on Dec. 18, 2018, Chinese Application No. 201811548248.6 filed on Dec. 18, 2018, and Chinese Application No. 201822129910.6 filed on Dec. 18, 2018. The entire contents of these applications are hereby incorporated herein by reference.

FIELD OF THE INVENTION

The present invention particularly relates to an atomizing sheet assembly and an atomizer.

BACKGROUND OF THE INVENTION

An atomizer comprises an atomizing sheet, an e-liquid guide member and an e-liquid compartment. The e-liquid guide member communicates the e-liquid compartment with the atomizing sheet. During operation, e-liquid in the e-liquid compartment is guided to an atomizing surface of the atomizing sheet by the e-liquid guide member, and is atomized to generate smoke for users to smoke.

In the prior art, due to the inconvenient control of the e-liquid guide rate of the e-liquid guide member, the e-liquid guide rate is unstable, the atomizing sheet is prone to immersion in the e-liquid or dry burning, the amount of smoke is unstable, and the user experience is poor.

In addition, since the atomizing surface of the atomizing sheet is directly communicated with an air outlet through an air outlet channel, when the atomizer is tilted, the e-liquid on the atomizing sheet may flow out through the air outlet channel to scald user's mouth.

Moreover, the child lock mechanism on the existing atomizer is composed of a spring, the spring is compressed and unlocked by pressing the spring, and then disassembly can be carried out, but the service life of the spring is limited and the spring easily fails; the child lock is complicated in structure and difficult to assemble, so higher cost is required; and when the e-liquid filling hole needs to be opened to fill e-liquid into the e-liquid compartment, the operation is cumbersome and the user experience is poor.

SUMMARY OF THE INVENTION

The purpose of the present invention is to provide an atomizing sheet assembly, an atomizer and an electronic cigarette against the shortcomings of the prior art.

In order to solve the technical problem of inconvenient control of the e-liquid guide rate of the e-liquid guide member described in the background art, the technical solution adopted by the present invention is:

An atomizing sheet assembly comprises an e-liquid guide member, an atomizing sheet and an atomizing seat, the atomizing sheet is fixed on the atomizing seat, and the e-liquid guide member is in contact with an atomizing surface of the atomizing sheet; the atomizing seat is made of an elastic material, the e-liquid guide member is flaky, the atomizing seat is provided with a through hole, and the flaky e-liquid guide member passes through the through hole and is in contact with the atomizing sheet.

With the above structure, the flaky e-liquid guide member passes through the through hole on the atomizing seat, and the degree of compression of the e-liquid guide member can be controlled by means of the size of the through hole on the atomizing seat, thereby adjusting the transfer rate of e-liquid in the e-liquid guide member; in addition, the atomizing seat is made of an elastic material, and the atomizing seat itself has certain elasticity, so the operation is simple and time-saving when the e-liquid guide member is assembled through the through hole, the e-liquid guide member in the through hole is squeezed uniformly by the elastic force on the wall of the through hole, and the flow rate of the e-liquid in the e-liquid guide member passing through the through hole is uniform, that is, the e-liquid guide rate of the e-liquid guide member is stable during smoking, the atomizing sheet is uneasy to immerse in e-liquid or dry-burnt, and the amount of smoke is stable.

As a preferred mode, the elastic material is silica gel.

As a preferred mode, the through hole comprises an upper hole surface and a lower hole surface, and the lower hole surface is flush with or higher than or lower than the atomizing surface of the atomizing sheet.

When the lower hole surface of the through hole is flush with the atomizing surface of the atomizing sheet, the e-liquid path is not bent, and the e-liquid in the e-liquid guide member flows through the through hole to the atomizing sheet relatively smoothly, so e-liquid is replenished more timely during the operation of the atomizing sheet, which can not only ensure the amount of smoke but also prevent dry burning. When the atomizing sheet is not operating, the e-liquid absorbed by the flaky e-liquid guide member is in a balanced and saturated state, so the phenomenon of immersion in the e-liquid does not occur.

When the lower hole surface of the through hole is higher than or lower than the atomizing surface of the atomizing sheet, the e-liquid guide member is bent at the through hole, so the e-liquid path is bent. When the atomizing sheet is not operating, the e-liquid absorbed by the flaky e-liquid guide member is in a balanced and saturated state, so the phenomenon of immersion in the e-liquid also does not occur.

Based on the same inventive concept, the present invention further provides an atomizer, comprising a shell in which an e-liquid compartment is arranged, characterized by further comprising the atomizing sheet assembly; an atomizing upper cover is arranged at a bottom of the shell, and the atomizing upper cover is provided with an e-liquid outlet communicating the e-liquid compartment with the e-liquid guide member.

In order to solve the technical problem in the background art that when the atomizer is tilted, the e-liquid on the atomizing sheet may flow out through the air outlet channel to scald user's mouth, the technical solution adopted by the present invention is:

Further, a support and a cavity are arranged in the shell, one end of the support is fixedly connected to the shell, the other end of the support passes through the atomizing upper cover and is opposite to the atomizing surface of the atomizing sheet, and a gap communicating the e-liquid guide member with the cavity is formed between an outer wall of the support and an inner wall of the atomizing upper cover; and an air outlet channel of the atomizer is arranged in the support.

With the above structure, when oblique smoking or when the atomizer is placed obliquely, the e-liquid on the atomizing sheet can enter the cavity in the shell through the gap between the outer wall of the support and the inner wall of the atomizing upper cover for storage, which solves the problem that the starting of the atomizing sheet is slow or the amount of smoke is small due to temporary immersion in e-liquid, and can also avoid the phenomenon that excess e-liquid on the atomizing sheet flows out to the mouth through the air outlet channel in the support to scald user's mouth.

Further, the atomizer comprises a spring, one end of the spring is connected to the support, and the other end of the spring abuts against the e-liquid guide member.

With the above structure, the spring can ensure reliable contact between the e-liquid guide member and the atomizing sheet. At the same time, after the external force squeezing the atomizing seat is removed, the restoring force of the spring can also reset the atomizing seat and the through hole thereof.

Further, the atomizer comprises a mouthpiece base detachably connected to a top of the shell, the top of the shell is provided with an inserting portion, and the mouthpiece base is provided with an inserted portion corresponding to the inserting portion.

Further, the inserting portion is provided with a limit groove, and the inserted portion is provided with a limit raised rib corresponding to the limit groove.

With the above structure, after the inserting portion is connected to the inserted portion, the limit raised rib is matched and connected with the limit groove by rotating the mouthpiece base, so that when the mouthpiece base rotates relative to the shell, the hand has a sense of gear limit, which improves user experience.

Further, the atomizer comprises a mouthpiece cover, and the mouthpiece cover is fixedly connected to the mouthpiece base and forms a rotating assembly rotatable around the inserting portion; the inserting portion is arranged at a central axis of the shell; the shell is further provided with an e-liquid filling hole for filling e-liquid into the e-liquid compartment, and a sealing ring is arranged at the e-liquid filling hole; and when the rotating assembly rotates around the inserting portion and opens or closes the e-liquid filling hole, the mouthpiece base always abuts against an edge of the sealing ring.

When e-liquid is filled, the mouthpiece cover is rotated to drive the rotating assembly to open the e-liquid filling hole. During the process of rotating the mouthpiece cover, the edge of the mouthpiece base presses the edge of the sealing ring all the time, so that the sealing ring does not fall off or wrinkle and deform during the rotation of the rotating assembly, which facilitates the adding of e-liquid and improves the sealing performance.

Further, a support movable in an axial direction of the shell is further arranged in the shell, and one end of the support is in contact with the atomizing seat.

With the above structure, the flaky e-liquid guide member passes through the through hole on the atomizing seat. When the support applies a pressure to the atomizing seat, the cross-sectional area of the through hole on the atomizing seat becomes small, and the e-liquid guide member in the through hole is squeezed, so the amount of e-liquid transferred from the e-liquid guide member to the atomizing sheet per unit time is reduced, which prevents the phenomenon of immersion of the atomizing sheet in the e-liquid.

As a preferred mode, the atomizer further comprises a mouthpiece base detachably connected to the top of the shell, and the mouthpiece base is fixedly connected to the mouthpiece cover and forms a rotating assembly rotatable about the axis of the shell; one end of the support has a squeezing portion corresponding to the through hole, the other end face of the support has an abutting portion that abuts against the mouthpiece base, and the mouthpiece base has concave-convex surfaces corresponding to the abutting portion.

With the above structure, when the rotating assembly rotates, the mouthpiece base drives the support to move toward the atomizing seat to adjust the e-liquid guide rate. Further, the support is provided with guide slots for guiding axial movement of the support, and guide raised ribs used to prevent circumferential rotation of the support and connected with the guide slots are arranged in the shell.

Further, the shell is provided with an e-liquid filling hole for filling e-liquid into the e-liquid compartment; and when the rotating assembly is rotated to open the e-liquid filling hole, the rotating assembly drives the support to move toward the atomizing seat and squeeze the through hole.

With the above structure, when the rotating assembly is rotated to fill e-liquid, the rotating assembly drives the support to move down and press against the atomizing seat, and the through hole in the atomizing seat becomes small, thereby changing the e-liquid guide state of the flaky e-liquid guide member, to prevent the e-liquid from leaking from e-liquid guide member due to the increase of air pressure in the e-liquid compartment during e-liquid filling.

In order to solve the above technical problems of short service life, complicated structure, difficult assembly and high cost of the spring type child lock mechanism in the background art, the technical solution adopted by the present invention is as follows:

Further, the shell is provided with an e-liquid filling hole for filling e-liquid into the e-liquid compartment; the top of the shell is provided with a rotating assembly capable of opening or closing the e-liquid filling hole, a limit ring is fixed on the shell, the limit ring has a cylindrical extension portion, the rotating assembly comprises a lock ring, the lock ring has an accommodating cavity, and the accommodating cavity has a rotating cavity matched with the extension portion; the atomizer further comprises an unlocking mechanism capable of locking or unlocking the connection relationship between the lock ring and the limit ring; and when the unlocking mechanism unlocks the connection relationship between the lock ring and the limit ring, the extension portion is placed in the rotating cavity, and the rotating assembly can rotate around the extension portion and open the e-liquid filling hole.

With the above structure, in the initial state, the unlocking mechanism locks the connection relationship between the lock ring and the limit ring, the rotating assembly cannot rotate and the e-liquid filling hole cannot be opened, so children can be prevented from opening the e-liquid filling hole at this time to cause e-liquid leakage or the risk of drinking e-liquid. When the e-liquid filling hole needs to be opened to fill e-liquid into the e-liquid compartment, the connection relationship between the lock ring and the limit ring is first unlocked by the unlocking mechanism. At this time, the extension portion is placed in the rotating cavity, and the rotating assembly can rotate around the extension portion and open the e-liquid filling hole.

As a preferred mode, the unlocking mechanism comprises a first limit surface arranged on an outer wall of the extension portion, and a second limit surface arranged on an inner wall of the accommodating cavity and matched with the first limit surface.

With the above structure, when the e-liquid filling hole needs to be opened to fill e-liquid into the e-liquid compartment, the rotating assembly is first slid, so that the first limit surface is misaligned and unlocked with the second limit surface, and the extension portion enters the rotating cavity. At this time, the rotating assembly is rotated, the rotating assembly rotates around the extension portion and opens the e-liquid filling hole, and e-liquid can be filled into the e-liquid compartment. By surface-to-surface matching, the unlocking mechanism has good reliability, simple structure, easy assembly and low cost, and the service life of the unlocking mechanism is prolonged.

After the e-liquid filling is completed, the rotating assembly is first rotated to close the e-liquid filling hole, and then the rotating assembly is slid until the first limit surface is aligned and locked with the second limit surface to complete the whole e-liquid filling process, so the e-liquid filling operation is simple and convenient.

In the smoking state or the non-filling state, the first limit surface is aligned and locked with the second limit surface, and the lock ring is locked and fixed. Since the unlocking requires two separate steps, children can be prevented from arbitrarily opening the e-liquid filling hole to drink e-liquid, or the phenomenon of e-liquid leakage caused by opening the e-liquid filling hole due to misoperation can be prevented.

As a preferred mode, the unlocking mechanism comprises a first raised rib arranged on the outer wall of the extension portion, and groove enclosed by two second ribs arranged on the inner wall of the accommodating cavity and matched with the first raised rib. In the smoking state or the non-filling state, the first raised ribs are caught in the grooves, and the lock ring is locked and fixed.

As a preferred mode, the rotating assembly further comprises a mouthpiece base and a mouthpiece cover, the mouthpiece base is fixed outside the limit ring, and the mouthpiece cover is fixed on a top of the mouthpiece base.

Further, a sealing ring is arranged at the e-liquid filling hole; and when the rotating assembly rotates and opens or closes the e-liquid filling hole, the mouthpiece base always abuts against an edge of the sealing ring.

When e-liquid is filled, the mouthpiece cover is rotated to drive the rotating assembly to open the e-liquid filling hole. During the process of rotating the mouthpiece cover, the edge of the mouthpiece base presses the edge of the sealing ring all the time, so that the sealing ring does not fall off or wrinkle and deform during the rotation of the rotating assembly, which facilitates the adding of e-liquid and improves the sealing performance.

Further, the shell has limit ribs, and the sealing ring has limit slots matched with the limit ribs to prevent the sealing ring from being taken out or shifted and deformed when the rotating assembly is rotated, thereby ensuring sealing performance.

Based on the same inventive concept, the present invention further provides an electronic cigarette, comprising a power supply unit, and characterized by further comprising the atomizer, wherein the atomizer is detachably connected to the power supply unit, and the power supply unit is electrically connected to the atomizing sheet. Compared with the prior art, the present invention can effectively adjust the e-liquid guide rate, the e-liquid guide rate of the e-liquid guide member is stable, the atomizing sheet is uneasy to immerse in e-liquid or dry-burnt, the amount of smoke is stable, and the e-liquid on the atomizing sheet is uneasy to flow out through the air outlet channel when the atomizer is tilted, which avoids scalding user's mouth. E-liquid is uneasy to leak when being filled into the e-liquid compartment. The operation of opening the e-liquid filling hole to fill the e-liquid into the e-liquid compartment is simple and convenient, and the child lock is reliable in structure. The safety is good, and the user experience is good.

In the figures: 1 e-liquid guide member, 2 atomizing sheet, 3 atomizing seat, 301 through hole, 3011 upper hole surface, 3012 lower hole surface, 4 shell, 401 inserting portion, 4011 limit groove, 402 e-liquid filling hole, 403 limit rib, 5 e-liquid compartment, 6 atomizing upper cover, 601 e-liquid outlet, 7 support, 701 squeezing portion, 702 abutting portion, 703 guide slot, 8 cavity, 9 gap, 10 spring, 11 mouthpiece base, 1101 inserted portion, 11011 limit raised rib,

1102 air inlet, 1103 concave-convex surface, 1104 clamping table, 12 mouthpiece cover, 1201 air outlet, 13 rotating assembly, 14 sealing ring, 15 limit ring, 1501 extension portion, 15011 first limit surface, 15012 first raised rib, 1502 clamping portion, 16 air tube, 17 atomizing bottom cover, 18 ring electrode, 19 e-liquid storage cotton, 20 insulating ring, 21 elastic electrode, 22 power supply unit, 23 air outlet channel, 24 lock ring, 2401 accommodating cavity, 24011 rotating cavity, 24012 second limit surface, 24013 second raised rib, 24014 groove.

DETAILED DESCRIPTION OF EMBODIMENTS

Embodiment of Atomizing Sheet Assembly

Figure 1:
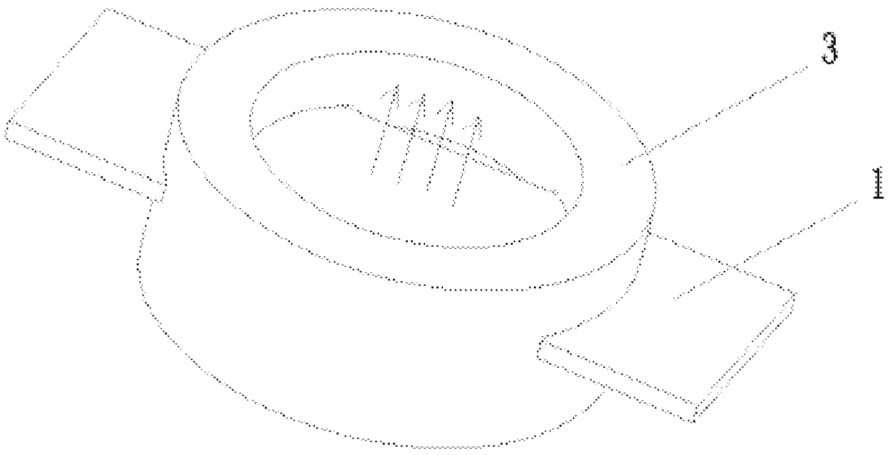
FIG. 1 is a schematic structural diagram of an embodiment of an atomizing sheet assembly.
Figure 2:
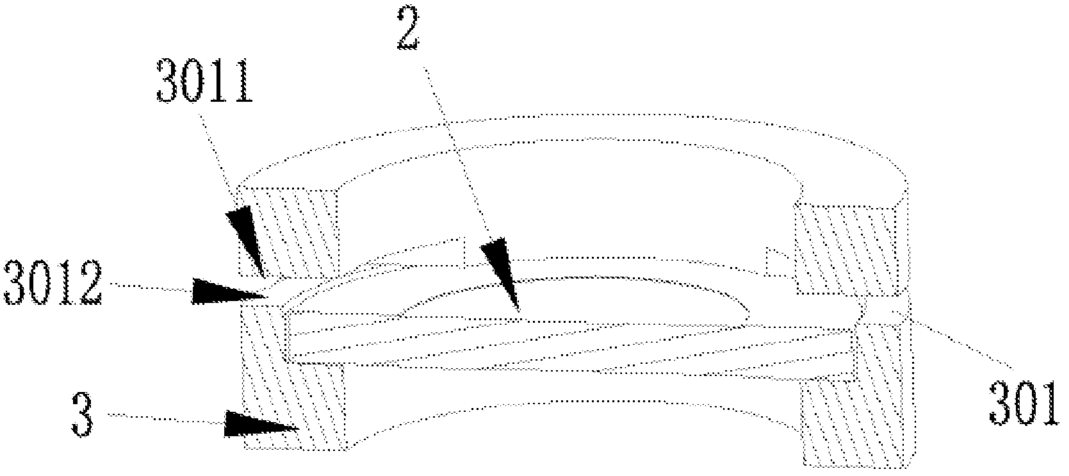
FIG. 2 is a schematic structural diagram after an e-liquid guide member is removed.

As shown in FIGS. 1 and 2, an embodiment of an atomizing sheet assembly comprises an e-liquid guide member 1, an atomizing sheet 2, and an atomizing seat 3 made of an elastic material. The atomizing sheet 2 is fixed on the atomizing seat 3, and the e-liquid guide member 1 is in contact with an atomizing surface of the atomizing sheet 2. The e-liquid guide member 1 is flaky atomizing cotton, the atomizing seat 3 is provided with a through hole 301, and the flaky e-liquid guide member 1 crosses the atomizing sheet 2 to pass through the through hole 301 and extends out along the through hole 301, so that the length of the e-liquid guide member 1 is longer than the diameter of the atomizing seat 3, and a crossing portion of the e-liquid guide member 1 is in contact with the atomizing sheet 2. The atomizing sheet 2 atomizes e-liquid in the e-liquid guide member 1 into smoke for a user to smoke during high-frequency oscillation, so the smoke is sprayed out from the surface of the atomizing sheet 2 corresponding to the e-liquid guide member 1. The direction denoted by arrows in FIG. 1 is a smoke spraying direction.

In this embodiment, for the convenience of assembly, the atomizing seat 3 is cylindrical; and the material of the atomizing seat 3 is silica gel. Since the silica gel has certain elasticity, when the e-liquid guide member 1 passes through the through hole 301 on the atomizing seat 3, the friction force is reduced, the e-liquid guide member 1 is not easily stretched, and the e-liquid guide member 1 can maintain the original state. Therefore, the degree of compression of the e-liquid guide member 1 can be controlled by means of the size of the through hole 301, and then the amount of e-liquid transferred from the e-liquid guide member 1 to the atomizing sheet 2 per unit time can be controlled. Since the e-liquid guide member 1 is not stretched, the e-liquid guide rate of the e-liquid guide member 1 is stable. Therefore, the amount of e-liquid can be controlled by adjusting the size of the through hole 301, the phenomenon of immersion in e-liquid or dry burning of the atomizing sheet 2 can be avoided, and the amount of smoke is stable.

The atomizing sheet 2 is piezoelectric ceramic or other types of ultrasonic atomizing sheet, and e-liquid is ultrasonically atomized on the surface of the atomizing sheet 2. When the atomizing sheet 2 is immersed in the e-liquid during high-frequency oscillation, the starting speed of the atomizing sheet 2 is slow, and the high-frequency oscillation of the atomizing sheet 2 causes the e-liquid to splash around (like hot boiling water splashing around), so a user easily sucks the e-liquid and is scalded by the e-liquid. Therefore, the cross-sectional area of the through hole 301 is 0.3-8 times the cross-sectional area of the e-liquid guide member 1. The amount of e-liquid flowing through the through hole 301 per unit time is controlled. For example, in the case of certain power, the starting speed of the ultrasonic atomizing sheet 2 is related to the amount of e-liquid to be atomized on the ultrasonic atomizing sheet 2, and the atomizing amount of the ultrasonic atomizing sheet 2 per second is 0.2 mg to 4 mg. Therefore, the transfer rate of the e-liquid is slightly faster than the atomizing rate, that is, 0.5 mg/s to 5.5 mg/s.

The through hole 301 comprises an upper hole surface 3011 and a lower hole surface 3012. For example, when the position of the lower hole surface 3012 is fixed, the size of the through hole 301 is adjusted by raising or lowering the upper hole surface 3011, thereby adjusting the degree of squeezing of the e-liquid guide member 1 by the peripheral wall of the through hole 301. When the lower hole surface 3012 is flush with the atomizing surface of the atomizing sheet 2, the e-liquid path is not bent, and the e-liquid on the e-liquid guide member 1 flows through the through hole 301 to the atomizing sheet 2 relatively smoothly, so e-liquid is replenished more timely during the operation of the atomizing sheet 2, which can not only ensure the amount of smoke but also prevent dry burning. When the atomizing sheet 2 is not operating, the flaky e-liquid guide member 1 absorbs e-liquid in a balanced and saturated state, so the phenomenon of immersion in the e-liquid does not occur. When the lower hole surface 3012 of the through hole 301 is higher than or lower than the atomizing surface of the atomizing sheet 2, the e-liquid guide member 1 is bent at the through hole 301, so the e-liquid path is also bent, and when the atomizing sheet 2 is not operating, the flaky e-liquid guide member 1 absorbs e-liquid in a balanced and saturated state, so the phenomenon of immersion in the e-liquid also does not occur.

Embodiment 1 of Atomizer

As shown in FIGS. 3 to 10, an atomizer comprises a shell 4 in which an e-liquid compartment 5 is arranged, and further comprises the atomizing sheet assembly. An atomizing upper cover 6 is arranged at a bottom of the shell 4, the atomizing upper cover 6 is provided with an e-liquid outlet 601 communicating the e-liquid compartment 5 with the e-liquid guide member 1, and a perforation is provided on a central axis of the atomizing upper cover 6.

A support 7 and a cavity 8 (in the first embodiment, the cavity 8 is enclosed by the shell 4, the atomizing upper cover 6, and the support 7) are further arranged in the shell 4, one end of the support 7 is fixedly connected to the shell 4, the other end of the support 7 extends into the perforation of the atomizing upper cover 6 and is opposite to the atomizing surface of the atomizing sheet 2, and a gap 9 communicating the e-liquid guide member 1 or the atomizing surface of the atomizing sheet 2 with the cavity 8 is formed between an outer wall of the support 7 and an inner wall of the perforation of the atomizing upper cover 6. An air outlet channel 23 of the atomizer is arranged in the support 7. When oblique smoking or when the atomizer is placed obliquely, the e-liquid on the atomizing sheet 2 can enter the cavity 8 in the shell 4 through the gap 9 between the outer wall of the support 7 and the inner wall of the atomizing upper cover 6 for storage, which solves the problem that the starting of the atomizing sheet 2 is slow or the amount of smoke is small due to temporary immersion in e-liquid, and can also avoid the phenomenon that excess e-liquid on the atomizing sheet 2 flows out to the mouth through the air outlet channel 23 in the support 7 to scald user's mouth.

The atomizer further comprises a spring 10, one end of the spring 10 is connected to the support 7, and the other end of the spring 10 abuts against the e-liquid guide member 1. The spring 10 can ensure reliable contact between the e-liquid guide member 1 and the atomizing sheet 2. After the external force squeezing the atomizing seat 3 is removed during assembly, the restoring force of the spring 10 can also reset the atomizing seat 3 and the through hole 301 thereof.

The atomizer further comprises a mouthpiece base 11 detachably connected to a top of the shell 4, the top of the shell 4 is provided with an inserting portion 401, and the mouthpiece base 11 is provided with an inserted portion 1101 corresponding to the inserting portion 401. The inserting portion 401 is provided with a limit groove 4011, and the inserted portion 1101 is provided with a limit raised rib 11011 corresponding to the limit groove 4011. After the inserting portion 401 is connected to the inserted portion 1101, the limit raised rib 11011 is matched and connected with the limit groove 4011 by rotating the mouthpiece base 11, so that the mouthpiece base 11 and the shell 4 have a hand feeling of gear limit when rotating, which improves user experience.

A limit ring 15 is riveted to and fixed in the inserted portion 1101 of the mouthpiece base 11, a hook (not shown) is arranged in the limit ring 15, and the inserting portion 401 of the shell 4 is provided with an inverted clamping table (not shown). After the inserting portion 401 is inserted into the inserted portion 1101, the inverted clamping table (not shown) is clamped by the hook (not shown), so that the mouthpiece base 11 rotates circumferentially relative to the shell 4 and cannot move relative to the axial direction of the shell 4.

The atomizer further comprises a mouthpiece cover 12, and the mouthpiece cover 12 is fixedly connected to the mouthpiece base 11 and forms a rotating assembly 13 rotatable around the inserting portion 401. The inserting portion 401 is arranged at a central axis of the shell 4. The shell 4 is further provided with an e-liquid filling hole 402 for filling e-liquid into the e-liquid compartment 5, and a sealing ring 14 is arranged at the e-liquid filling hole 402. When the rotating assembly 13 rotates around the inserting portion 401 and opens or closes the e-liquid filling hole 402, the mouthpiece base 11 always abuts against an edge of the sealing ring 14. When e-liquid is filled, the mouthpiece cover 12 is rotated to drive the rotating assembly 13 to open the e-liquid filling hole 402. During the process of rotating the mouthpiece cover 12, the edge of the mouthpiece base 11 presses the edge of the sealing ring 14 all the time, so that the sealing ring 14 does not fall off or wrinkle and deform during the rotation of the rotating assembly 13, which facilitates the adding of e-liquid and improves the sealing performance.

The periphery of the e-liquid filling hole 402 of the shell 4 is provided with an accommodating groove (not shown) for accommodating the sealing ring 14, and limit ribs 403 are arranged in the accommodating groove. The sealing ring 14 is provided with limit slots matched with the limit ribs 403 (the limit slots are not shown in the drawings, but it does not affect the understanding and implementation of the present invention by those skilled in the art). The sealing ring 14 is fixed in the accommodating groove (not shown) and the limit ribs 403 are caught in the limit slots to prevent the sealing ring 14 from being taken out or shifted and deformed when the rotating assembly 13 is rotated, thereby ensuring sealing performance.

Figure 4:
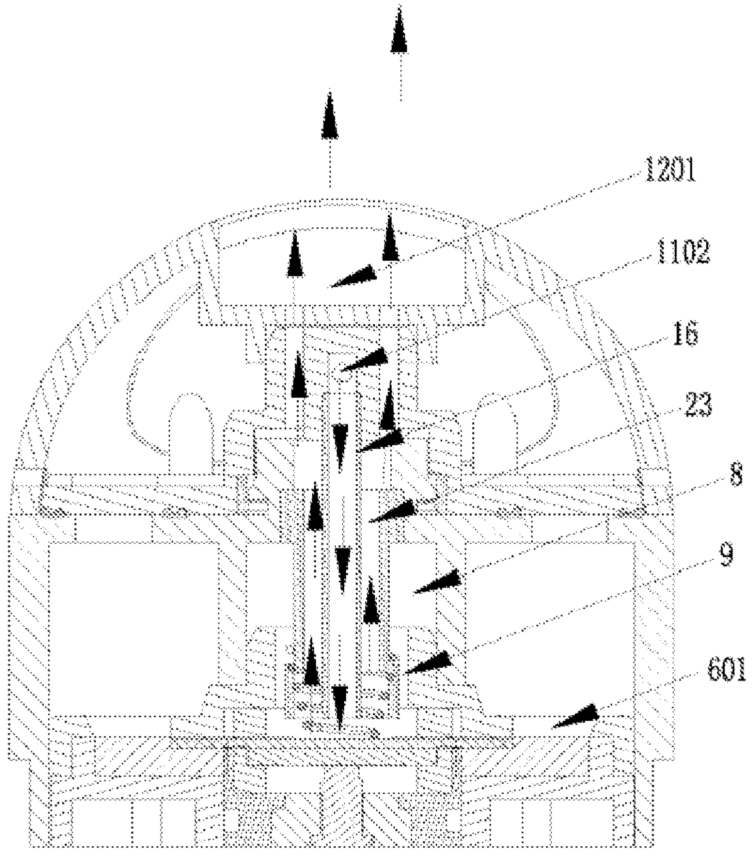
FIG. 4 is a schematic diagram of an air path of the first embodiment of the atomizer.
Figure 5:
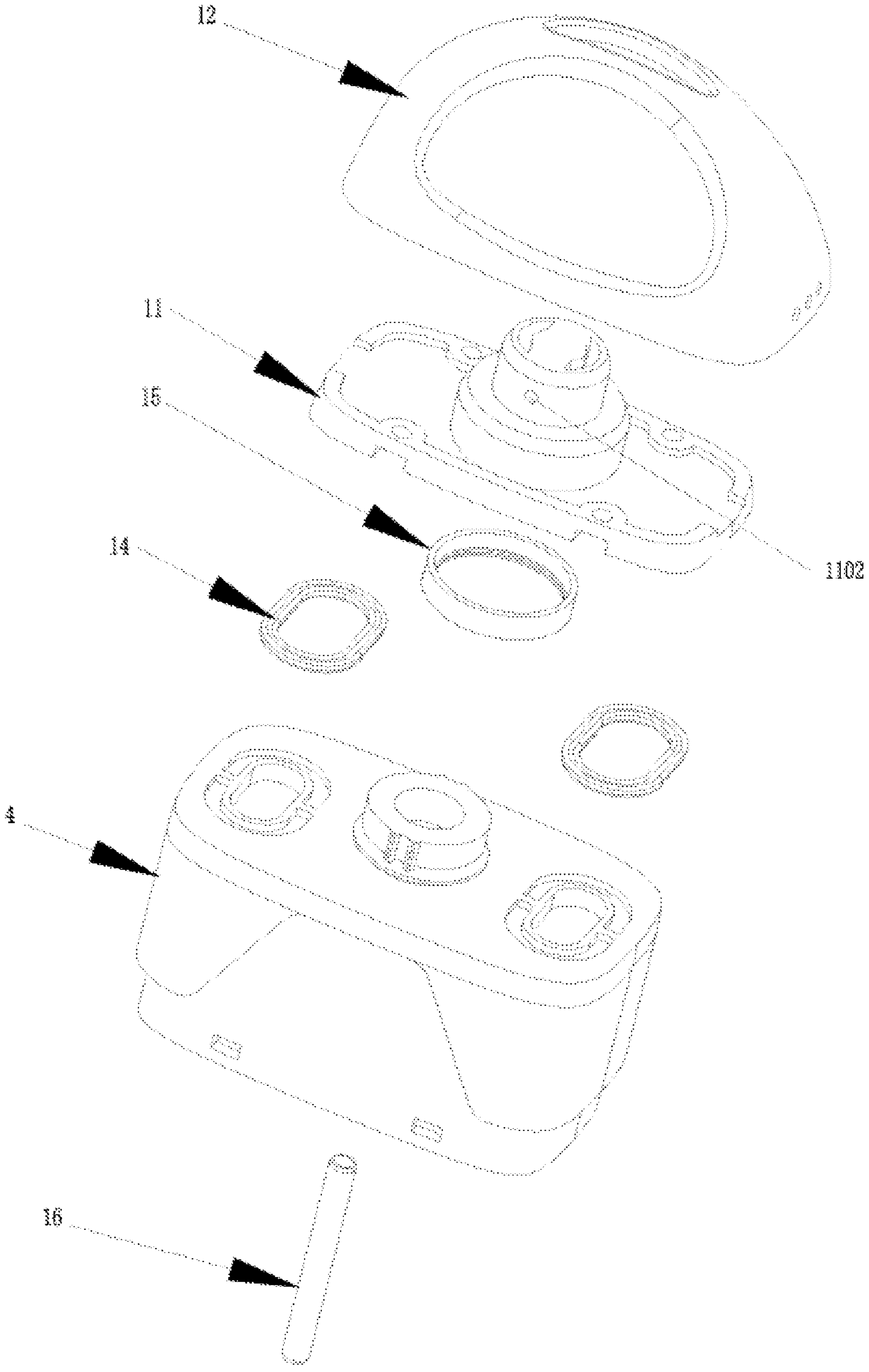
FIG. 5 is an exploded view of the upper part in FIG. 3.
Figure 6:
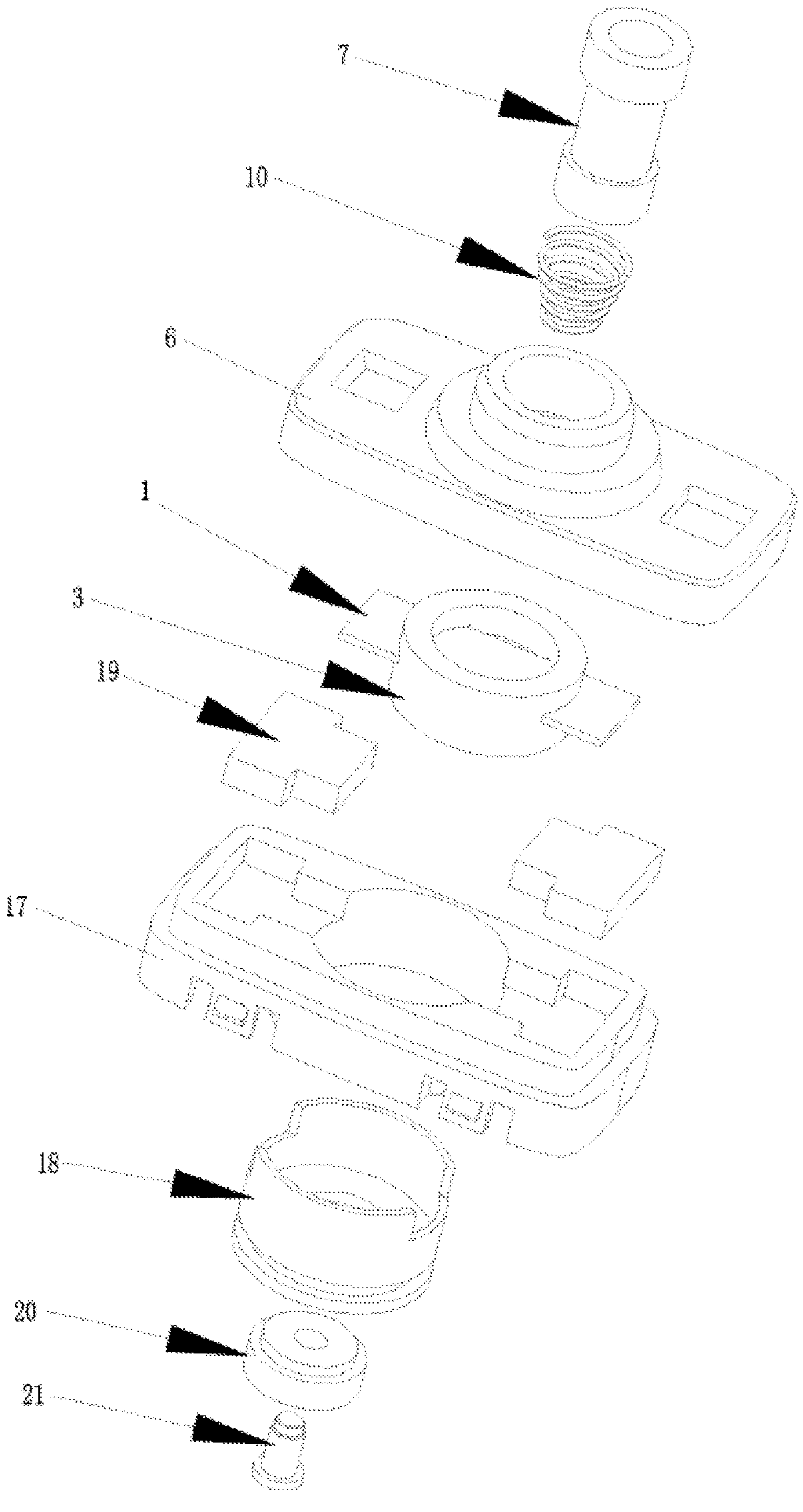
FIG. 6 is an exploded view of the lower part in FIG. 3.
Figure 7:
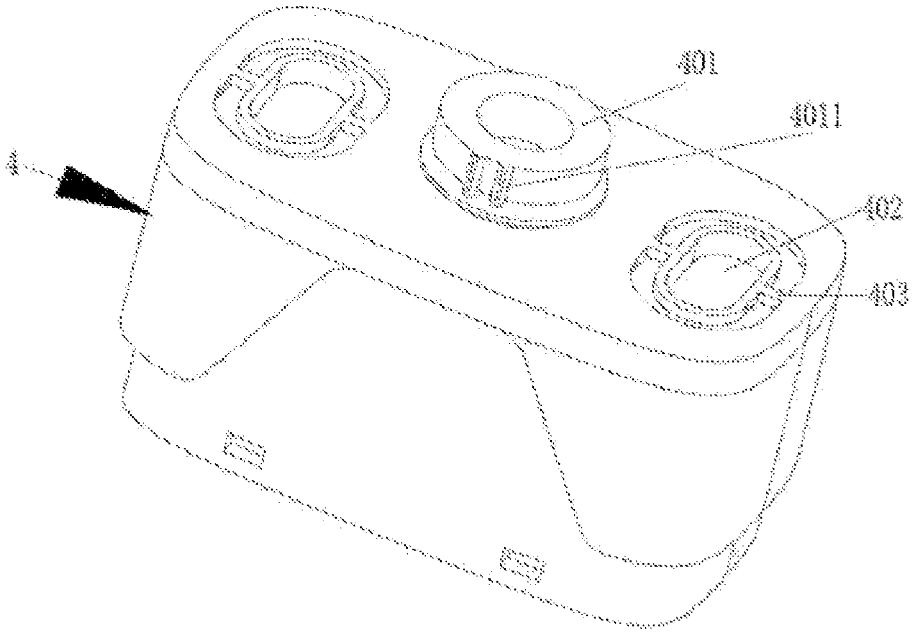
FIG. 7 is a schematic structural diagram of a shell in FIG. 3.
Figure 8:
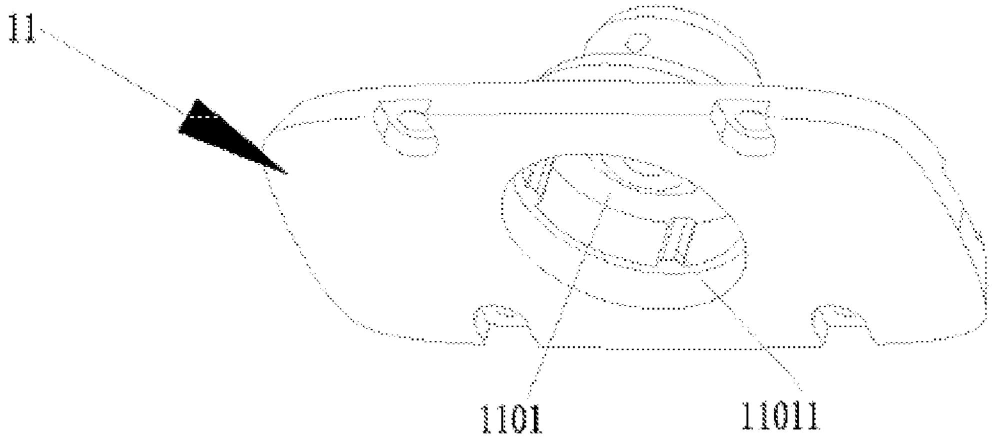
FIG. 8 is a schematic structural diagram of a mouthpiece base in FIG. 3.
Figure 9:
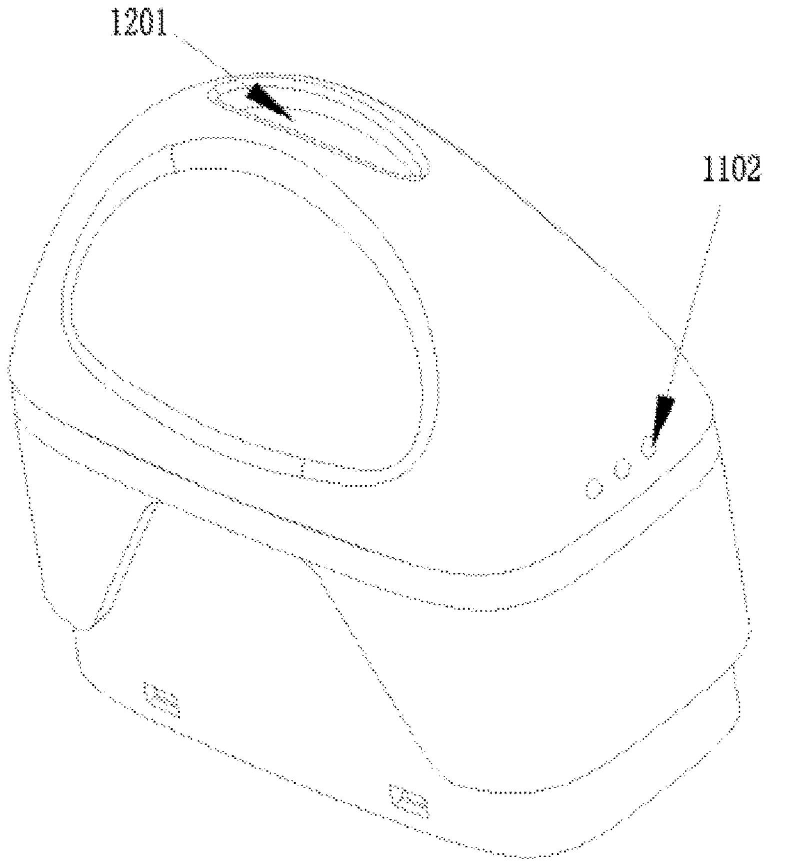
FIG. 9 is a schematic structural diagram of the atomizer when an e-liquid filling hole is closed.
Figure 10:
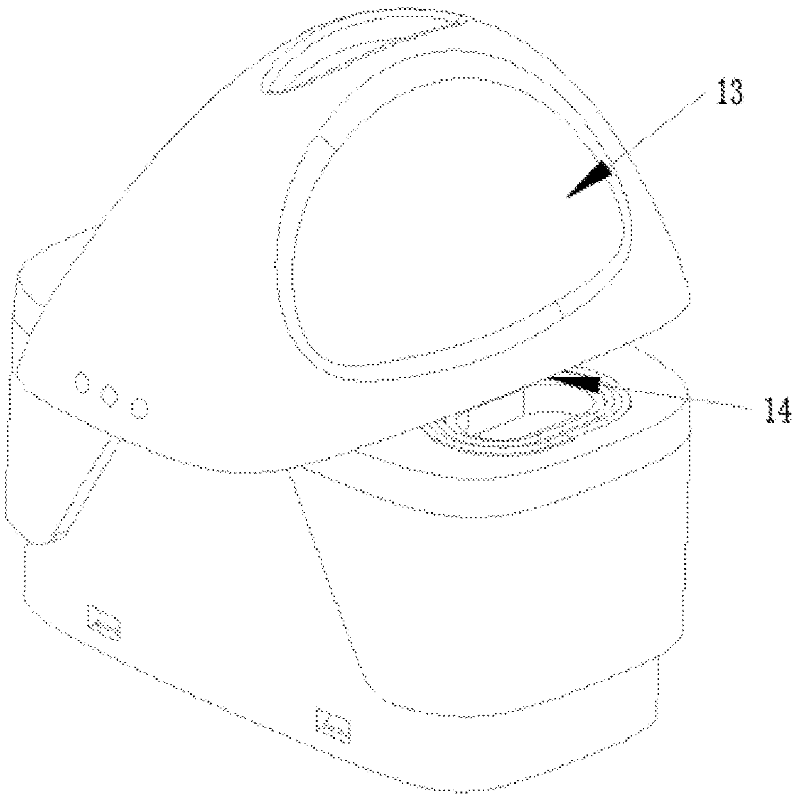
FIG. 10 is a schematic structural diagram of the atomizer when the e-liquid filling hole is opened.
Figure 11:
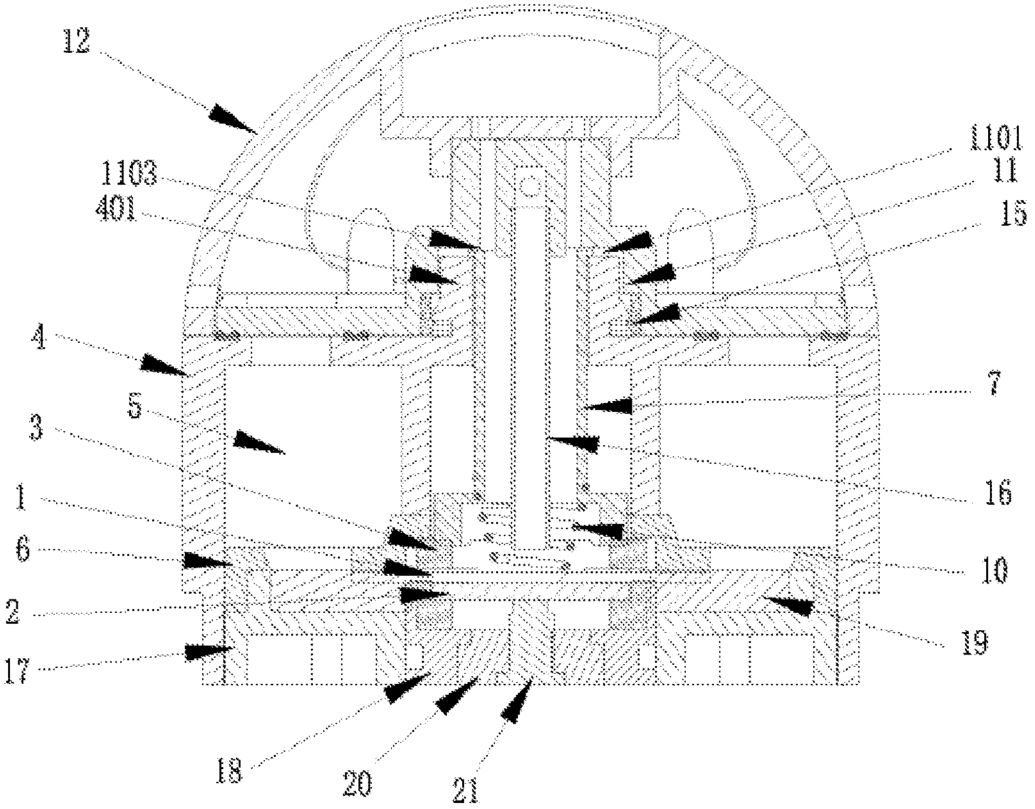
FIG. 11 is a schematic structural diagram of a second embodiment of an atomizer.

The atomizer further comprises an air tube 16, one end of the air tube 16 is fixedly connected to the mouthpiece base 11, and the other end of the air tube 16 extends into the support 7 and is opposite to the atomizing surface of the atomizing sheet 2. The air outlet channel 23 is formed between the air tube 16 and the support 7. The mouthpiece base 11 is provided with an air inlet 1102, and the mouthpiece cover 12 is provided with an air outlet 1201. As shown in FIG. 4, the air inlet 1102, the air tube 16, the atomizing surface of the atomizing sheet 2, the air outlet channel 23, and the air outlet 1201 are communicated in sequence.

Figure 3:
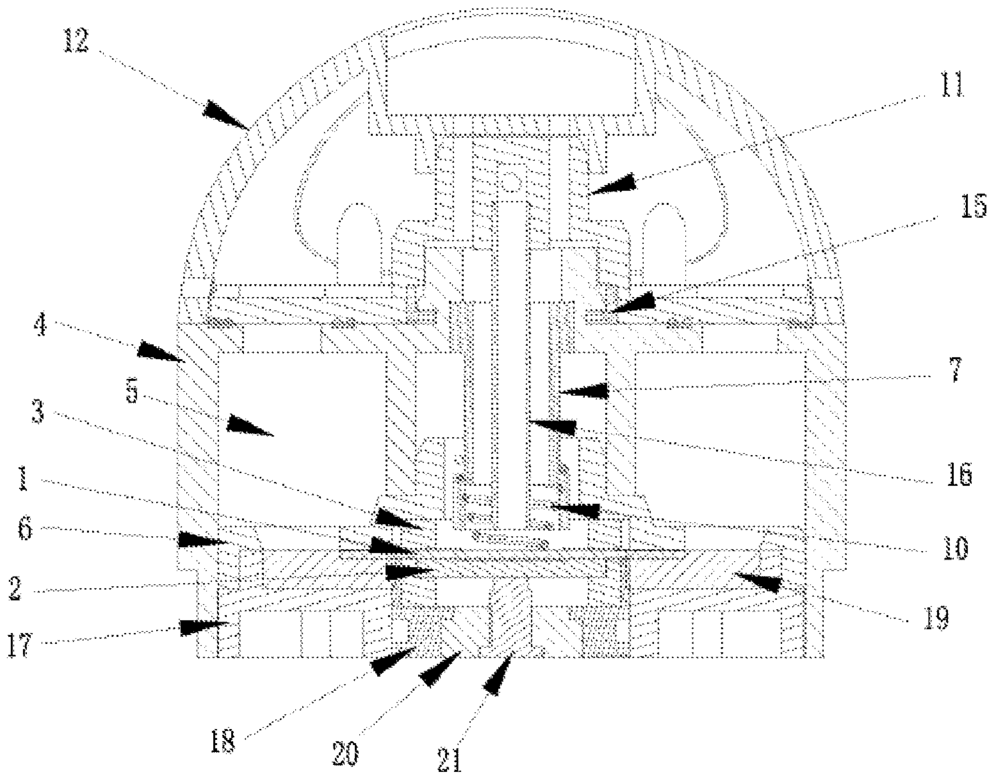
FIG. 3 is a schematic structural diagram of a first embodiment of an atomizer.

As shown in FIG. 3, an atomizing bottom cover 17 is further arranged at a bottom of the atomizing upper cover 6, and the atomizing seat 3 is fixed on the atomizing bottom cover 17 through a ring electrode 18. The atomizing bottom cover 17 is further provided with e-liquid storage cotton 19. The e-liquid compartment 5, the e-liquid outlet 601, the e-liquid storage cotton 19, the e-liquid guide member 1, and the atomizing sheet 2 are communicated in sequence. The elastic electrode 21 is connected to the ring electrode 18 in an insulating manner through an insulating ring 20.

As shown in FIGS. 3 and 4, in the first embodiment of the present invention, since the atomizing seat 3 is arranged between the ring electrode 18 and the atomizing upper cover 6, the through hole 301 on the atomizing seat 3 can be squeezed by pushing the ring electrode 18 upward to adjust the e-liquid guide rate of the e-liquid guide member 1.

Embodiment 2 of Atomizer

As shown in FIGS. 11 to 15, 9 and 10, the second embodiment of the atomizer comprises a shell 4. An e-liquid compartment 5, an e-liquid guide member 1, an atomizing sheet 2, and an atomizing seat 3 made of an elastic material are arranged in the shell 4. The atomizing sheet 2 is fixed on the atomizing seat 3, and the e-liquid guide member 1 is in contact with an atomizing surface of the atomizing sheet 2. An atomizing upper cover 6 is arranged at a bottom of the shell 4, the atomizing upper cover 6 is provided with an e-liquid outlet 601 communicating the e-liquid compartment 5 with the e-liquid guide member 1, and e-liquid in the e-liquid compartment 5 flows from the e-liquid outlet 601 to the e-liquid guide member 1. A perforation is formed on a central axis of the atomizing upper cover 6. The e-liquid guide member 1 is flaky atomizing cotton, the atomizing seat 3 is provided with a through hole 301, the flaky e-liquid guide member 1 crosses the atomizing sheet 2 to pass through the through hole 301 and extends out along the through hole 301, so that the length of the e-liquid guide member 1 is longer than the diameter of the atomizing seat 3, and a crossing portion of the e-liquid guide member 1 is in contact with the atomizing sheet 2. The atomizing sheet 2 atomizes e-liquid in the e-liquid guide member 1 into smoke for users to smoke during high-frequency oscillation, so the smoke is sprayed out from the surface of the atomizing sheet 2 corresponding to the e-liquid guide member 1. A support 7 movable in an axial direction of the shell 4 is further arranged in the shell 4, and one end of the support 7 is in contact with the atomizing seat 3.

The support 7 can move along the axial direction of the shell 4. When the support 7 moves, the through hole 301 on the atomizing seat 3 can be squeezed to change the size of the through hole 301, so as to squeeze the e-liquid guide member 1 and adjust the e-liquid guide rate of the e-liquid guide member 1. In addition, because the atomizing seat 3 made of an elastic material has certain elasticity, when the support 7 squeezes the atomizing seat 3, the through hole 301 on the atomizing seat 3 becomes small, and the e-liquid guide rate of the e-liquid guide member 1 decreases to prevent the atomizing sheet 2 from being immersed in e-liquid. When the support 7 does not squeeze the atomizing seat 3, the atomizing seat 3 restores the through hole 301 to the original shape by its own elastic force, which can increase the e-liquid guide rate of the e-liquid guide member 1 to increase the amount of smoke during atomization and prevent dry burning.

In this embodiment, for the convenience of assembly, the atomizing seat 3 is cylindrical, and the material of the atomizing seat 3 is silica gel. Since the silica gel has certain elasticity, when the e-liquid guide member 1 passes through the through hole 301 on the atomizing seat 3, the friction force is reduced, the e-liquid guide member 1 is not easily stretched, and the e-liquid guide member 1 can maintain the original state. Therefore, the degree of compression of the e-liquid guide member 1 can be controlled by means of the size of the through hole 301, and then the amount of e-liquid transferred from the e-liquid guide member 1 to the atomizing sheet 2 per unit time can be controlled. Since the e-liquid guide member 1 is not stretched, the e-liquid guide rate of the e-liquid guide member 1 is stable. Therefore, the amount of e-liquid can be controlled by adjusting the size of the through hole 301, the phenomenon of immersion in e-liquid or dry burning of the atomizing sheet 2 can be avoided, and the amount of smoke is stable.

The atomizing sheet 2 is piezoelectric ceramic or other types of ultrasonic atomizing sheet, and e-liquid is ultrasonically atomized on the surface of the atomizing sheet 2. When the atomizing sheet 2 is immersed in the e-liquid during high-frequency oscillation, the starting speed of the atomizing sheet 2 is slow, and the high-frequency oscillation of the atomizing sheet 2 causes the e-liquid to splash around (like hot boiling water splashing around), so a user easily sucks the e-liquid and is scalded by the e-liquid. Therefore, the cross-sectional area of the through hole 301 is 0.3-8 times the cross-sectional area of the e-liquid guide member 1. The amount of e-liquid flowing through the through hole 301 per unit time is controlled. For example, in the case of certain power, the starting speed of the ultrasonic atomizing sheet 2 is related to the amount of e-liquid to be atomized on the ultrasonic atomizing sheet 2, and the atomizing amount of the ultrasonic atomizing sheet 2 per second is 0.2 mg to 4 mg. Therefore, the transfer rate of the e-liquid is slightly faster than the atomizing rate, that is, 0.5 mg/s to 5.5 mg/s.

The through hole 301 comprises an upper hole surface 3011 and a lower hole surface 3012, and the lower hole surface 3012 is flush with or higher than or lower than the atomizing surface of the atomizing sheet 2.

For example, when the position of the lower hole surface 3012 is fixed, the size of the through hole 301 is adjusted by raising or lowering the upper hole surface 3011, thereby adjusting the degree of squeezing of the e-liquid guide member 1 by the peripheral wall of the through hole 301. When the lower hole surface 3012 is flush with the atomizing surface of the atomizing sheet 2, the e-liquid path is not bent, and the e-liquid on the e-liquid guide member 1 flows through the through hole 301 to the atomizing sheet 2 relatively smoothly, so e-liquid is replenished more timely during the operation of the atomizing sheet 2, which can not only ensure the amount of smoke but also prevent dry burning. When the atomizing sheet 2 is not operating, the flaky e-liquid guide member 1 absorbs e-liquid in a balanced and saturated state, so the phenomenon of immersion in the e-liquid does not occur. When the lower hole surface 3012 of the through hole 301 is higher than or lower than the atomizing surface of the atomizing sheet 2, the e-liquid guide member 1 is bent at the through hole 301, so the e-liquid path is also bent, and when the atomizing sheet 2 is not operating, the flaky e-liquid guide member 1 absorbs e-liquid in a balanced and saturated state, so the phenomenon of immersion in the e-liquid also does not occur.

The atomizer further comprises a mouthpiece base 11 detachably connected to a top of the shell 4, the top of the shell 4 is provided with an inserting portion 401, and the mouthpiece base 11 is provided with an inserted portion 1101 corresponding to the inserting portion 401. The mouthpiece base 11 is fixedly connected to the mouthpiece cover 12 and forms a rotating assembly 13 rotatable about the axis of the shell 4. One end of the support 7 has a squeezing portion 701 corresponding to the through hole 301, the other end face of the support 7 has an abutting portion 702 that abuts against the mouthpiece base 11, and the mouthpiece base 11 has concave-convex surfaces 1103 corresponding to the abutting portion 702. All these concave-convex surfaces 1103 are not on the same plane. When the rotating assembly 13 rotates, the mouthpiece base 11 drives the support 7 to move toward the atomizing seat 3 to adjust the e-liquid guide rate. Therefore, when the rotating assembly 13 is rotated by 90°, the e-liquid filling hole is opened, the user can add e-liquid into the e-liquid compartment 5, the abutting portion 702 of the support 7 abuts against the most protruding concave-convex surface 1103, that is, the through hole 301 is squeezed to a minimum state, and the e-liquid guide rate of the e-liquid guide member 1 is the smallest to prevent the leakage of e-liquid from the through hole 301 during filling. When the rotating assembly 13 is rotated by 180°, the e-liquid filling hole is closed, the abutting portion 702 of the support 7 abuts against the second protruding concave-convex surface 1103, that is, the through hole 301 is squeezed to a moderate state, and the e-liquid guide rate of the e-liquid guide member 1 is also in an intermediate state, which improves the taste of smoke. When the rotating assembly 13 is rotated by 360°, the e-liquid filling hole 402 is closed, the abutting portion 702 of the support 7 abuts against the lowest concave-convex surface 1103, that is, the through hole 301 is squeezed to the minimum state, and the e-liquid guide rate of the e-liquid guide member 1 is fast, thereby preventing dry burning and increasing the amount of smoke.

A limit ring 15 is riveted to and fixed in the inserted portion 1101 of the mouthpiece base 11, a hook (not shown) is arranged in the limit ring 15, and the inserting portion 401 of the shell 4 is provided with an inverted clamping table (not shown). After the inserting portion 401 is inserted into the inserted portion 1101, the inverted clamping table (not shown) is clamped by the hook (not shown), so that the mouthpiece base 11 rotates circumferentially relative to the shell 4 and cannot move relative to the axial direction of the shell 4.

The support 7 is provided with guide slots 703 for guiding axial movement of the support 7, and guide raised ribs (which are not shown in the drawings, but do not affect understanding) used to prevent circumferential rotation of the support 7 are arranged in the shell 4, and the guide raised ribs are connected with the guide slots 703.

The shell 4 is provided with an e-liquid filling hole 402 for filling e-liquid into the e-liquid compartment 5. When the rotating assembly 13 is rotated to open the e-liquid filling hole 402, the rotating assembly 13 drives the support 7 to move toward the atomizing seat 3 and squeeze the through hole 301. When the rotating assembly 13 is rotated to fill e-liquid, the rotating assembly 13 drives the support 7 to move down and press against the atomizing seat 3, and the through hole 301 in the atomizing seat 3 becomes small, thereby changing the e-liquid guide state of the flaky e-liquid guide member 1, to prevent the e-liquid from leaking from e-liquid guide member due to the increase of air pressure in the e-liquid compartment 5 during e-liquid filling.

A sealing ring 14 is arranged at the e-liquid filling hole 402. When the rotating assembly 13 rotates around the inserting portion 401 and opens or closes the e-liquid filling hole 402, the mouthpiece base 11 always abuts against an edge of the sealing ring 14.

When e-liquid is filled, the mouthpiece cover 12 is rotated to drive the rotating assembly 13 to open the e-liquid filling hole 402. During the process of rotating the mouthpiece cover 12, the edge of the mouthpiece base 11 presses the edge of the sealing ring 14 all the time, so that the sealing ring 14 does not fall off or wrinkle and deform during the rotation of the rotating assembly 13, which facilitates the adding of e-liquid and improves the sealing performance.

The periphery of the e-liquid filling hole 402 of the shell 4 is provided with an accommodating groove (not shown) for accommodating the sealing ring 14, and limit ribs are arranged in the accommodating groove. The sealing ring 14 is provided with limit slots matched with the limit ribs (the limit ribs and the limit slots are not shown in the drawings, but it does not affect the understanding and implementation of the present invention by those skilled in the art). The sealing ring 14 is fixed in the accommodating groove (not shown) and the limit ribs 403 are caught in the limit slots to prevent the sealing ring 14 from being taken out or shifted and deformed when the rotating assembly 13 is rotated, thereby ensuring sealing performance.

A cavity 8 (in the second embodiment, the cavity 8 is enclosed by the shell 4, the atomizing upper cover 6, and the support 7) is further arranged in the shell 4, one end of the support 7 passes through the atomizing upper cover 6 and is in contact with the atomizing seat 3, and a gap 9 communicating the e-liquid guide member 1 with the cavity 8 is formed between an outer wall of the support 7 and an inner wall of the atomizing upper cover 6. An air outlet channel 23 of the atomizer is arranged in the support 7. When oblique smoking or when the atomizer is placed obliquely, the e-liquid on the atomizing sheet 2 can enter the cavity 8 in the shell 4 through the gap 9 between the outer wall of the support 7 and the inner wall of the atomizing upper cover 6 for storage, which solves the problem that the starting of the atomizing sheet 2 is slow or the amount of smoke is small due to temporary immersion in e-liquid, and can also avoid the phenomenon that excess e-liquid on the atomizing sheet 2 flows out to the mouth through the air outlet channel 23 in the support 7 to scald user's mouth.

The atomizer further comprises a spring 10, one end of the spring 10 is connected to the support 7, and the other end of the spring 10 abuts against the e-liquid guide member 1. The spring 10 can ensure reliable contact between the e-liquid guide member 1 and the atomizing sheet 2. After the external force squeezing the atomizing seat 3 is removed during assembly, the restoring force of the spring 10 can also reset the atomizing seat 3 and the through hole 301 thereof.

Figure 14:
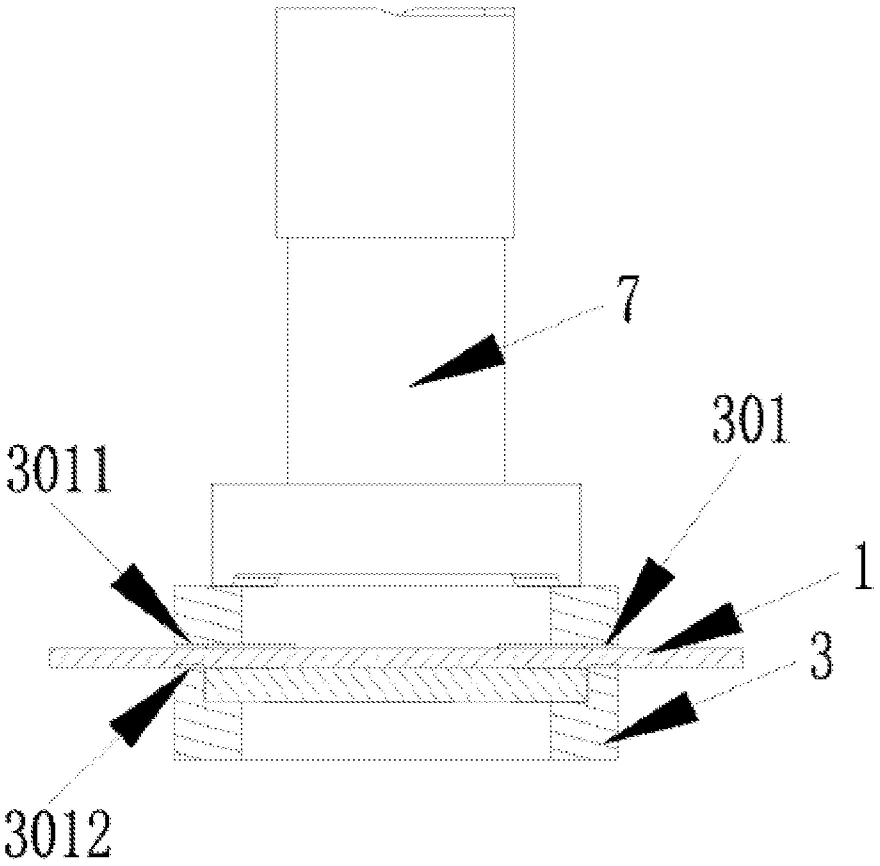
FIG. 14 is a schematic diagram showing that the support does not squeeze an atomizing seat.

As shown in FIG. 14, before the support 7 squeezes the atomizing seat 3, the e-liquid guide member 1 is in a normal state, and the through hole 301 is not deformed. The atomizing seat 3 restores to its original shape after being squeezed by the support 7, which mainly relies on the elastic force of deformation of the spring 10 and the through hole 301.

Figure 15:
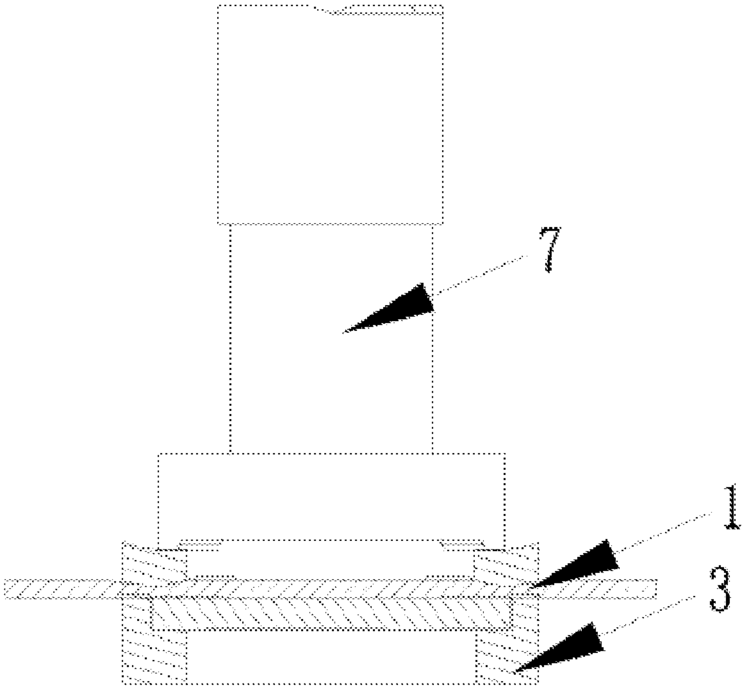
FIG. 15 is a schematic diagram showing that the support squeezes the atomizing seat.

As shown in FIG. 15, after the support 7 moves downward, the through hole 301 is squeezed and deformed, so that the e-liquid guide member 1 is squeezed tighter, which limits the e-liquid guide rate and achieves the effect of preventing e-liquid leakage.

An atomizing bottom cover 17 is further arranged at a bottom of the atomizing upper cover 6, and the atomizing seat 3 is fixed on the atomizing bottom cover 17 through a ring electrode 18. The atomizing bottom cover 17 is provided with e-liquid storage cotton 19. The e-liquid compartment 5, the e-liquid outlet 601, the e-liquid storage cotton 19, the e-liquid guide member 1, and the atomizing sheet 2 are communicated in sequence. The elastic electrode 21 is connected to the ring electrode 18 in an insulating manner through an insulating ring 20.

Figure 12:
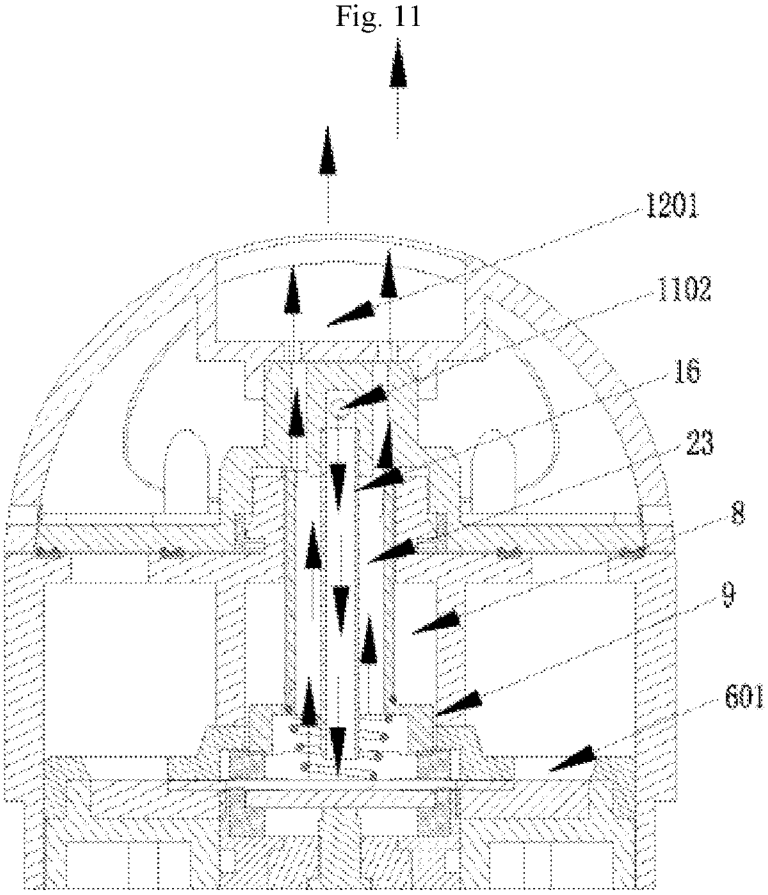
FIG. 12 is a schematic diagram of an air path of the second embodiment of the atomizer.
Figure 13:
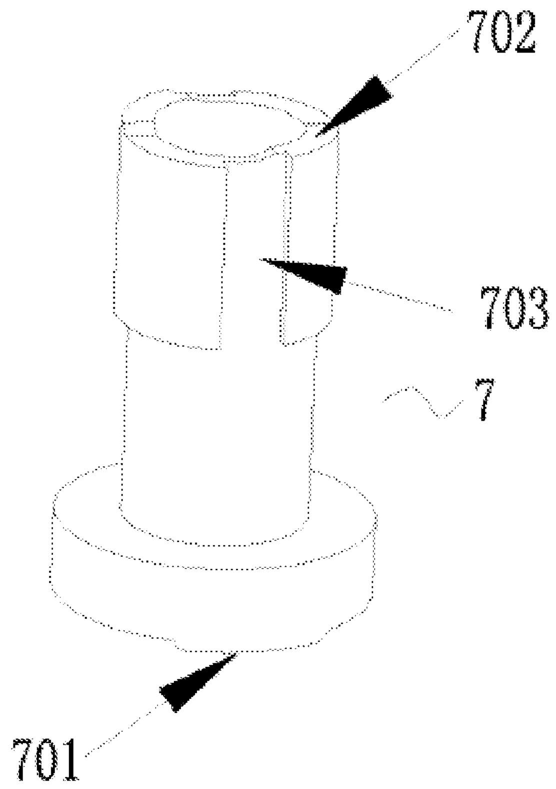
FIG. 13 is a schematic structural diagram of a support.

The atomizer further comprises an air tube 16, one end of the air tube 16 is fixedly connected to the mouthpiece base 11, and the other end of the air tube 16 extends into the support 7 and is opposite to the atomizing surface of the atomizing sheet 2. The air outlet channel 23 is formed between the air tube 16 and the support 7. The mouthpiece base 11 is provided with an air inlet 1102, and the mouthpiece cover 12 is provided with an air outlet 1201. As shown in FIG. 12, the air inlet 1102, the air tube 16, the atomizing surface of the atomizing sheet 2, the air outlet channel 23, and the air outlet 1201 are communicated in sequence.

Embodiment 3 of Atomizer

As shown in FIGS. 16 to 23, the third embodiment of the atomizer comprises a shell 4, an e-liquid compartment 5 is arranged in the shell 4, and the shell 4 is provided with an e-liquid filling hole 402 for filling e-liquid into the e-liquid compartment 5. The top of the shell 4 is provided with a rotating assembly 13 capable of opening or closing the e-liquid filling hole 402, a limit ring 15 is fixed on the shell 4, the limit ring 15 has a cylindrical extension portion 1501, the rotating assembly 13 comprises a lock ring 24, the lock ring 24 has an accommodating cavity 2401, and the accommodating cavity 2401 has a rotating cavity 24011 matched with the extension portion 1501. The atomizer further comprises an unlocking mechanism capable of locking or unlocking the connection relationship between the lock ring 24 and the limit ring 15. When the unlocking mechanism unlocks the connection relationship between the lock ring 24 and the limit ring 15, the extension portion 1501 is placed in the rotating cavity 24011, and the rotating assembly 13 can rotate around the extension portion 1501 and open the e-liquid filling hole 402. In the initial state, the unlocking mechanism locks the connection relationship between the lock ring 24 and the limit ring 15. At this time, the rotating assembly 13 cannot rotate and the e-liquid filling hole 402 cannot be opened. When the e-liquid filling hole 402 needs to be opened to fill e-liquid into the e-liquid compartment 5, the connection relationship between the lock ring 24 and the limit ring 15 is first unlocked by the unlocking mechanism. At this time, the extension portion 1501 is placed in the rotating cavity 24011, and the rotating assembly 13 can rotate around the extension portion 1501 and open the e-liquid filling hole 402.

The unlocking mechanism comprises a first limit surface 15011 arranged on an outer wall of the extension portion 1501, and a second limit surface 24012 arranged on an inner wall of the accommodating cavity 2401 and matched with the first limit surface 15011. When the e-liquid filling hole 402 needs to be opened to fill e-liquid into the e-liquid compartment 5, the rotating assembly 13 is first slid, so that the first limit surface 15011 is misaligned and unlocked with the second limit surface 24012, and the extension portion 1501 enters the rotating cavity 24011. At this time, the rotating assembly 13 is rotated, the rotating assembly 13 rotates around the extension portion 1501 and opens the e-liquid filling hole 402, and e-liquid can be filled into the e-liquid compartment 5. After the e-liquid filling is completed, the rotating assembly 13 is first rotated to close the e-liquid filling hole 402, and then the rotating assembly 13 is slid until the first limit surface 15011 is aligned and locked with the second limit surface 24012 to complete the whole e-liquid filling process, so the e-liquid filling operation is simple and convenient.

Figure 21:
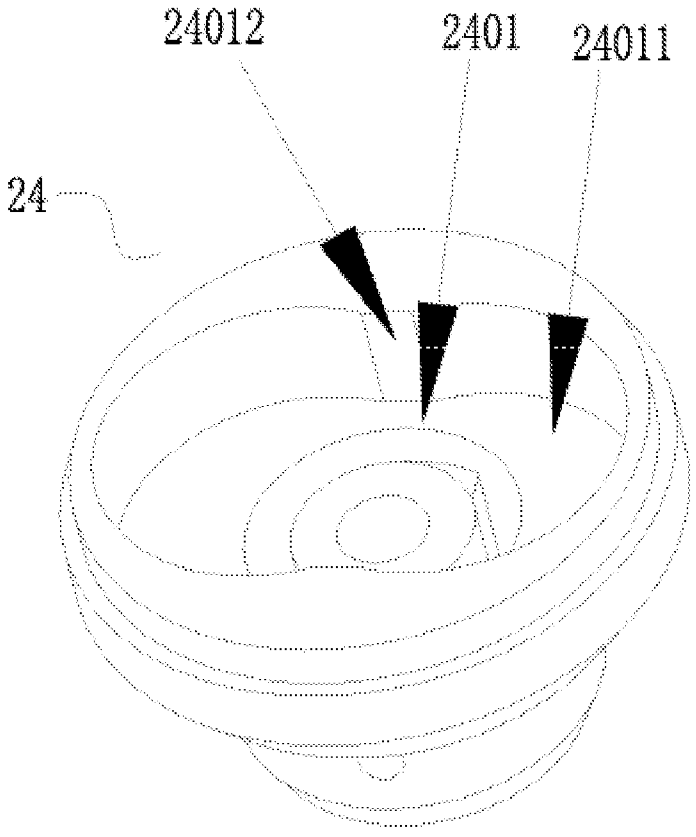
FIG. 21 is a schematic diagram of a first embodiment of a lock ring.

In the smoking state or the non-filling state, the first limit surface 15011 is aligned and locked with the second limit surface 24012, and the lock ring 24 is locked and fixed. Since the unlocking requires two separate steps, children can be prevented from arbitrarily opening the e-liquid filling hole 402, or the phenomenon of e-liquid leakage caused by opening the e-liquid filling hole 402 due to misoperation can be prevented. As shown in FIG. 21, two rotating cavities 24011 are symmetrically arranged in the accommodating cavity 2401, the two rotating cavities 24011 intersect at two positions, second limit surfaces 24012 are provided at the intersecting positions, that is, second limit surfaces 24012 are provided symmetrically, and the distance between the symmetrical second limit surfaces 24012 is smaller than the diameter of the rotating cavity 24011, so when the rotating assembly 13 is slid so that the extension portion 1501 enters the rotating cavity 24011 and rotates, that is, when the rotating assembly 13 and the shell 4 form an angle of 1° to 179° or 181° to 359°, the two second limit surfaces 24012 limit the sliding of the rotating assembly 13. First limit surfaces 15011 are symmetrically provided on the outer wall of the extension portion 1501, the distance between the symmetrical first limit surfaces 15011 is smaller than the diameter of the extension portion 1501, and the distance between the symmetrical first limit surfaces 15011 is equal to the distance between the symmetrical second limit surfaces 24012, so when the rotating assembly 13 is aligned with the shell 4 (the angle is 0° or 180° or 360°), the first limit surfaces 15011 are aligned with the second limit surfaces 24012, the rotating assembly 13 can be slid to reset, the rotating assembly 13 is locked, and e-liquid filling holes 402 are closed. Two e-liquid filling holes 402 are symmetrically provided on the shell 4. When the rotating assembly 13 is rotated to open the e-liquid filling holes 402, the user adds e-liquid into the e-liquid compartment 5 through one of the e-liquid filling holes 402, and the other e-liquid filling hole 402 can timely discharge the air pressure in the e-liquid compartment 5, so that air pressures inside and outside the e-liquid compartment 5 are balanced, which can prevent the e-liquid from being squeezed onto the atomizing sheet 2 to cause the phenomenon of immersion in e-liquid.

Figure 22:
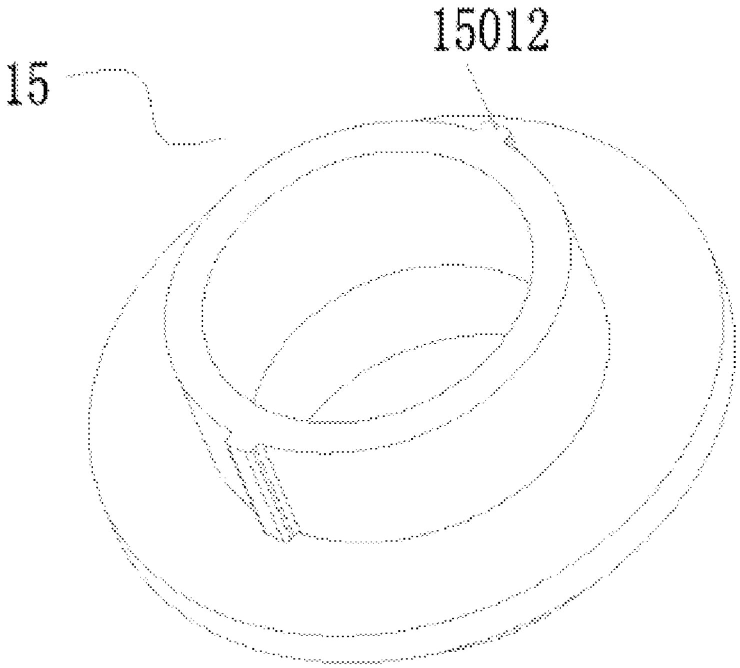
FIG. 22 is a schematic diagram of a second embodiment of the limit ring.
Figure 23:
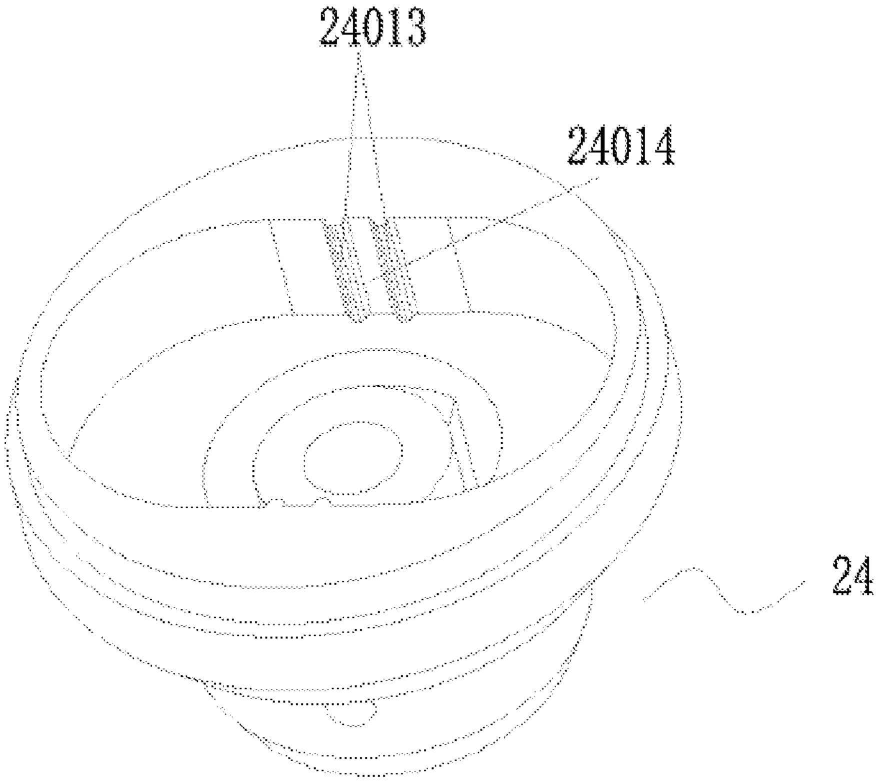
FIG. 23 is a schematic diagram of a second embodiment of the lock ring.
Figure 24:
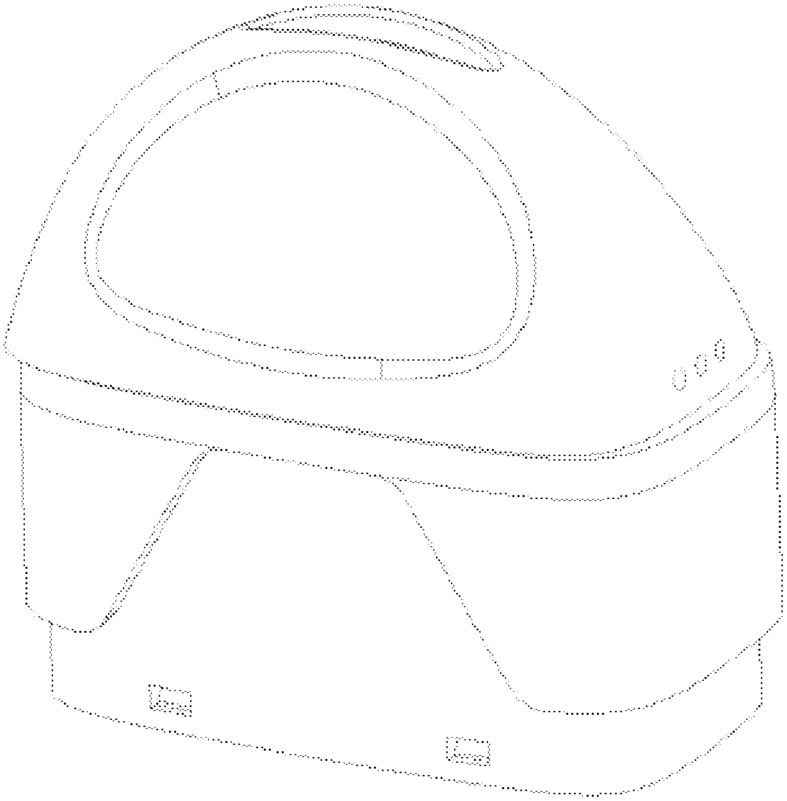
FIG. 24 is a schematic structural diagram of the atomizer after a rotating assembly is slid.
Figure 25:
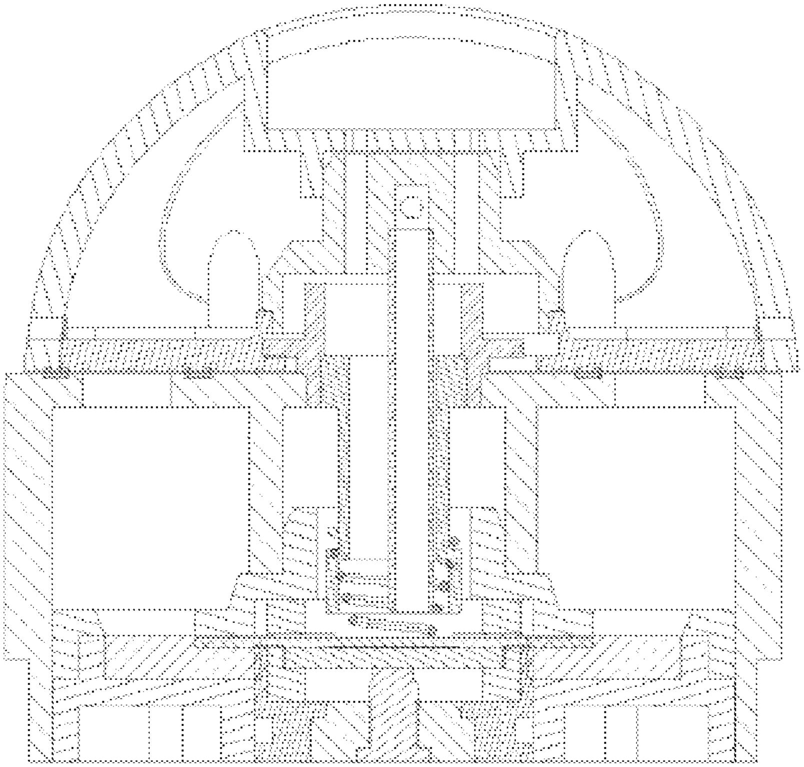
FIG. 25 is a cross-sectional view of FIG. 24.
Figure 26:
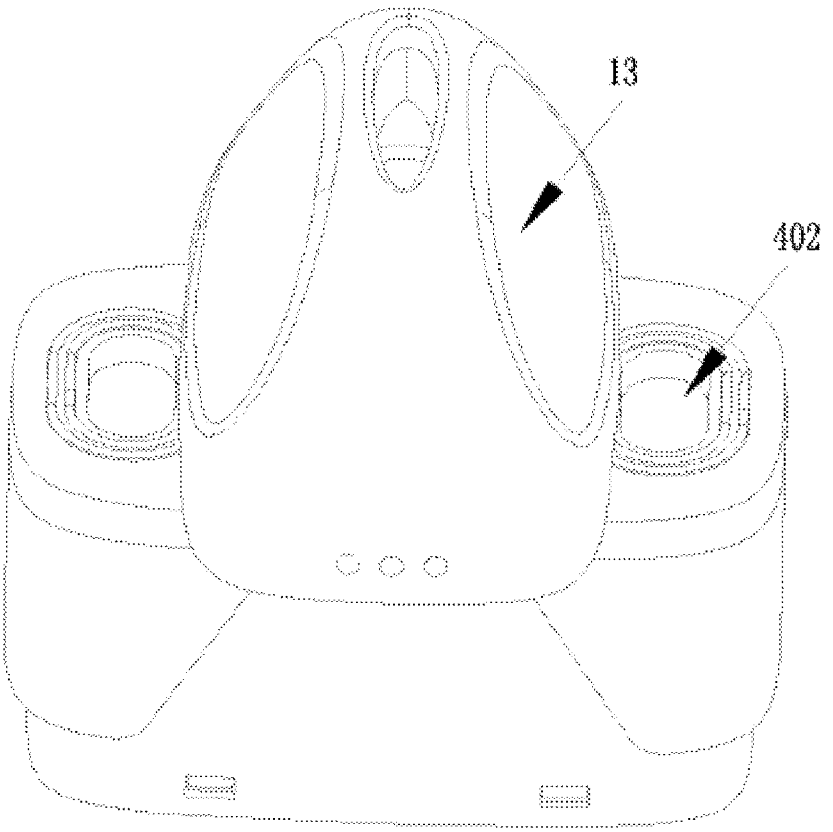
FIG. 26 is a schematic structural diagram of the atomizer after the rotating assembly is rotated.
Figure 27:
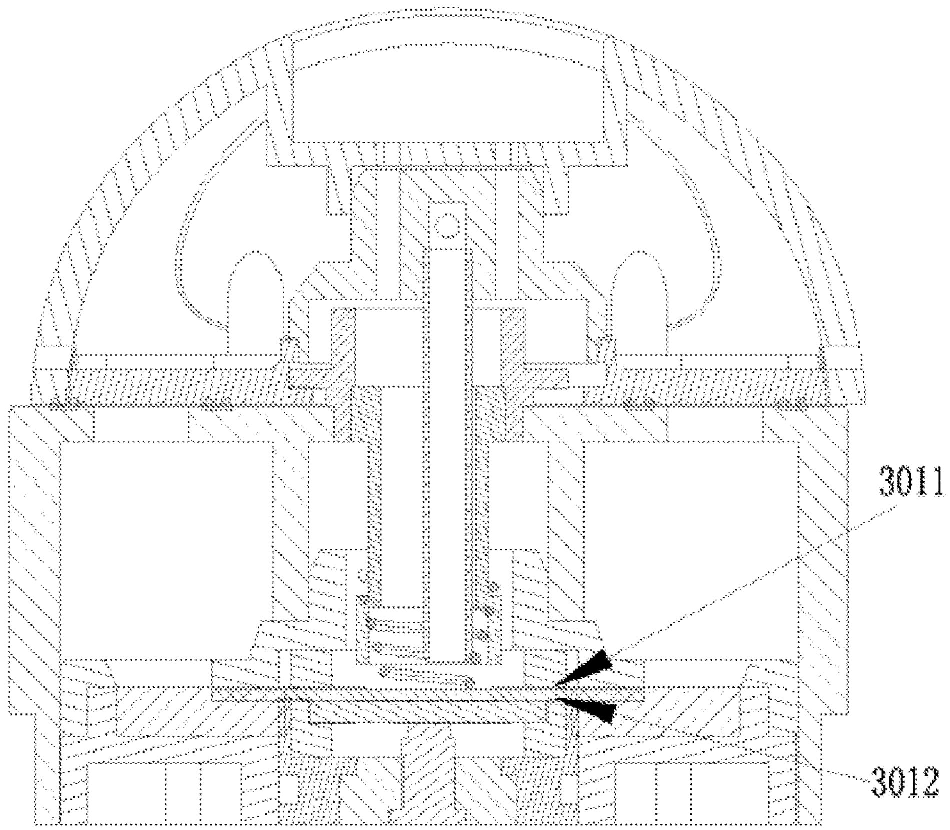
FIG. 27 is a cross-sectional view of FIG. 26.
Figure 28:
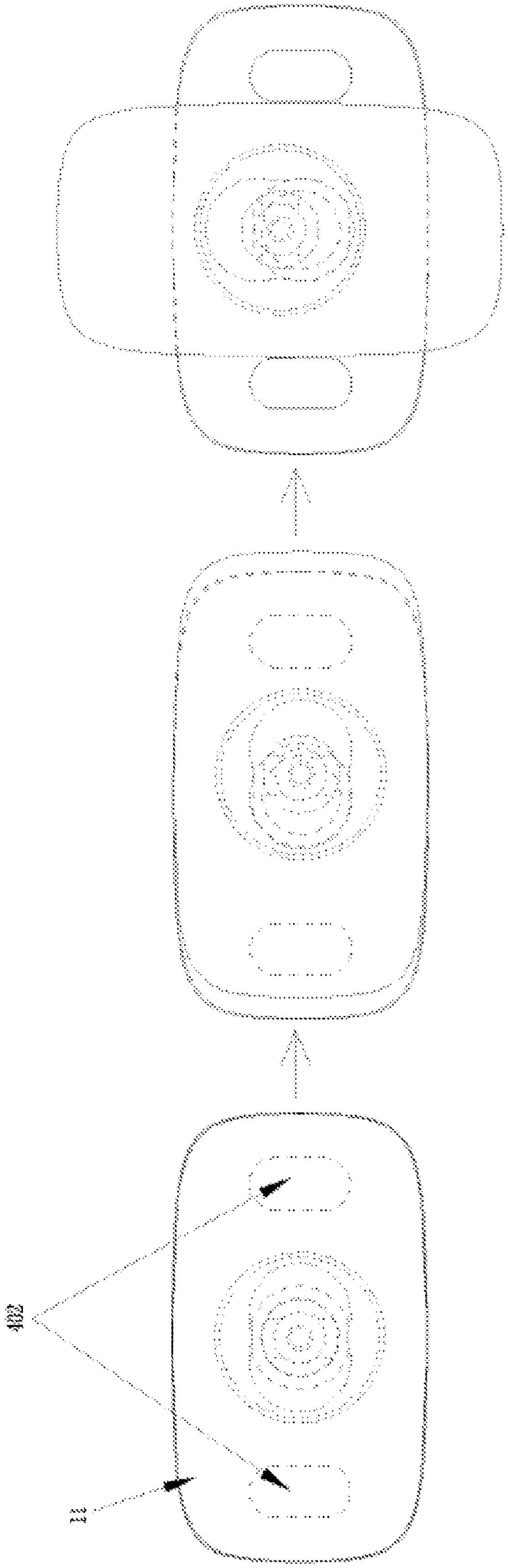
FIG. 28 is a schematic diagram showing each state of the e-liquid filling hole from closing to opening.
Figure 29:
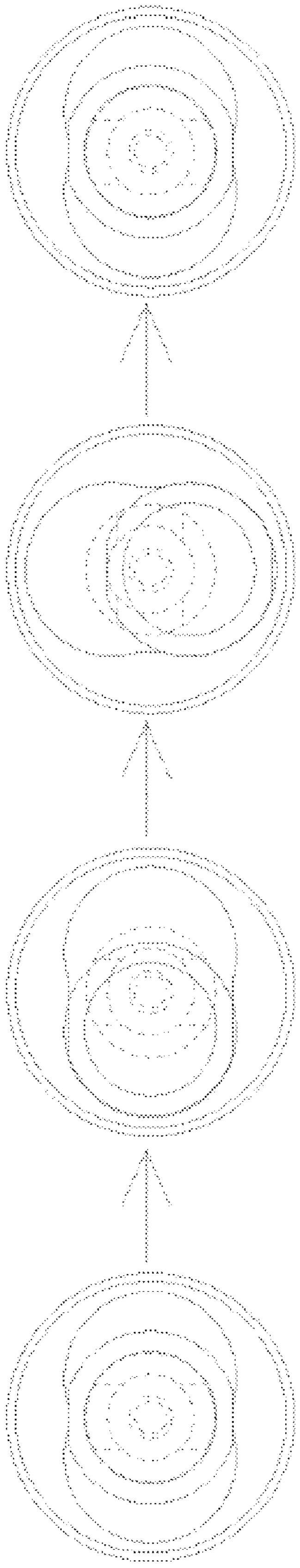
FIG. 29 is a schematic diagram of a movement locus between the lock ring and the limit ring during the unlocking process of the e-liquid filling hole.

FIGS. 22 and 23 show another structure of the unlocking structure, comprising a first raised rib 15012 on the outer wall of the extension portion 1501, and grooves 24014 enclosed by two second raised ribs 24013 arranged on the inner wall of the accommodating cavity 2401 and matched with the first raised rib 15012. When the first raised ribs 15012 are clamped in the grooves 24014, the lock ring 24 is locked. When the first raised ribs 15012 are disengaged from the grooves 24014, the lock ring 24 is unlocked. The hand has a sense of gears when locking and unlocking, so the experience is good.

An e-liquid guide member 1, an atomizing sheet 2, and an atomizing seat 3 made of an elastic material are further arranged in the shell 4, the atomizing sheet 2 is fixed on the atomizing seat 3, and the e-liquid guide member 1 is in contact with an atomizing surface of the atomizing sheet 2. The e-liquid guide member 1 is flaky atomizing cotton, the atomizing seat 3 is provided with a through hole 301, the flaky e-liquid guide member 1 crosses the atomizing sheet 2 to pass through the through hole 301 and extends out along the through hole 301, so that the length of the e-liquid guide member 1 is longer than the diameter of the atomizing seat 3, and a crossing portion of the e-liquid guide member 1 is in contact with the atomizing sheet 2. The atomizing sheet 2 atomizes e-liquid in the e-liquid guide member 1 into smoke for users to smoke during high-frequency oscillation, so the smoke is sprayed out from the surface of the atomizing sheet 2 corresponding to the e-liquid guide member 1. An atomizing upper cover 6 is arranged at a bottom of the shell 4, the atomizing upper cover 6 is provided with an e-liquid outlet 601 communicating the e-liquid compartment 5 with the e-liquid guide member 1, and a perforation is provided on a central axis of the atomizing upper cover 6.

In this embodiment, for the convenience of assembly, the atomizing seat 3 is cylindrical; and the material of the atomizing seat 3 is silica gel. Since the silica gel has certain elasticity, when the e-liquid guide member 1 passes through the through hole 301 on the atomizing seat 3, the friction force is reduced, the e-liquid guide member 1 is not easily stretched, and the e-liquid guide member 1 can maintain the original state. Therefore, the degree of compression of the e-liquid guide member 1 can be controlled by means of the size of the through hole 301, and then the amount of e-liquid transferred from the e-liquid guide member 1 to the atomizing sheet 2 per unit time can be controlled. Since the e-liquid guide member 1 is not stretched, the e-liquid guide rate of the e-liquid guide member 1 is stable. Therefore, the amount of e-liquid can be controlled by adjusting the size of the through hole 301, the phenomenon of immersion in e-liquid or dry burning of the atomizing sheet 2 can be avoided, and the amount of smoke is stable.

The atomizing sheet 2 is piezoelectric ceramic or other types of ultrasonic atomizing sheet, and e-liquid is ultrasonically atomized on the surface of the atomizing sheet 2. When the atomizing sheet 2 is immersed in the e-liquid during high-frequency oscillation, the starting speed of the atomizing sheet 2 is slow, and the high-frequency oscillation of the atomizing sheet 2 causes the e-liquid to splash around (like hot boiling water splashing around), so a user easily sucks the e-liquid and is scalded by the e-liquid. Therefore, the cross-sectional area of the through hole 301 is 0.3-8 times the cross-sectional area of the e-liquid guide member 1. The amount of e-liquid flowing through the through hole 301 per unit time is controlled. For example, in the case of certain power, the starting speed of the ultrasonic atomizing sheet 2 is related to the amount of e-liquid to be atomized on the ultrasonic atomizing sheet 2, and the atomizing amount of the ultrasonic atomizing sheet 2 per second is 0.2 mg to 4 mg. Therefore, the transfer rate of the e-liquid is slightly faster than the atomizing rate, that is, 0.5 mg/s to 5.5 mg/s.

The through hole 301 comprises an upper hole surface 3011 and a lower hole surface 3012. For example, when the position of the lower hole surface 3012 is fixed, the size of the through hole 301 is adjusted by raising or lowering the upper hole surface 3011, thereby adjusting the degree of squeezing of the e-liquid guide member 1 by the peripheral wall of the through hole 301. When the lower hole surface 3012 is flush with the atomizing surface of the atomizing sheet 2, the e-liquid path is not bent, and the e-liquid on the e-liquid guide member 1 flows through the through hole 301 to the atomizing sheet 2 relatively smoothly, so e-liquid is replenished more timely during the operation of the atomizing sheet 2, which can not only ensure the amount of smoke but also prevent dry burning. When the atomizing sheet 2 is not operating, the flaky e-liquid guide member 1 absorbs e-liquid in a balanced and saturated state, so the phenomenon of immersion in the e-liquid does not occur. When the lower hole surface 3012 of the through hole 301 is higher than or lower than the atomizing surface of the atomizing sheet 2, the e-liquid guide member 1 is bent at the through hole 301, so the e-liquid path is also bent, and when the atomizing sheet 2 is not operating, the flaky e-liquid guide member 1 absorbs e-liquid in a balanced and saturated state, so the phenomenon of immersion in the e-liquid also does not occur.

A support 7 and a cavity 8 (in the third embodiment, the cavity 8 is enclosed by the shell 4, the atomizing upper cover 6, and the support 7) are further arranged in the shell 4, one end of the support 7 is fixedly connected to the shell 4 through the limit ring 15, the other end of the support 7 extends into the perforation of the atomizing upper cover 6 and is opposite to the atomizing surface of the atomizing sheet 2, and a gap 9 communicating the e-liquid guide member 1 or the atomizing surface of the atomizing sheet 2 with the cavity 8 is formed between an outer wall of the support 7 and an inner wall of the perforation of the atomizing upper cover 6. An air outlet channel 23 of the atomizer is arranged in the support 7. When oblique smoking or when the atomizer is placed obliquely, the e-liquid on the atomizing sheet 2 can enter the cavity 8 in the shell 4 through the gap 9 between the outer wall of the support 7 and the inner wall of the atomizing upper cover 6 for storage, which solves the problem that the starting of the atomizing sheet 2 is slow or the amount of smoke is small due to temporary immersion in e-liquid, and can also avoid the phenomenon that excess e-liquid on the atomizing sheet 2 flows out to the mouth through the air outlet channel 23 in the support 7 to scald user's mouth.

The atomizer further comprises a spring 10, one end of the spring 10 is connected to the support 7, and the other end of the spring 10 abuts against the e-liquid guide member 1. The spring 10 can ensure reliable contact between the e-liquid guide member 1 and the atomizing sheet 2. After the external force squeezing the atomizing seat 3 is removed during assembly, the restoring force of the spring 10 can also reset the atomizing seat 3 and the through hole 301 thereof.

An atomizing bottom cover 17 is further arranged at a bottom of the atomizing upper cover 6, and the atomizing seat 3 is fixed on the atomizing bottom cover 17 through a ring electrode 18. The atomizing bottom cover 17 is provided with e-liquid storage cotton 19. The e-liquid compartment 5, the e-liquid outlet 601, the e-liquid storage cotton 19, the e-liquid guide member 1, and the atomizing sheet 2 are communicated in sequence. The elastic electrode 21 is connected to the ring electrode 18 in an insulating manner through an insulating ring 20.

Figure 16:
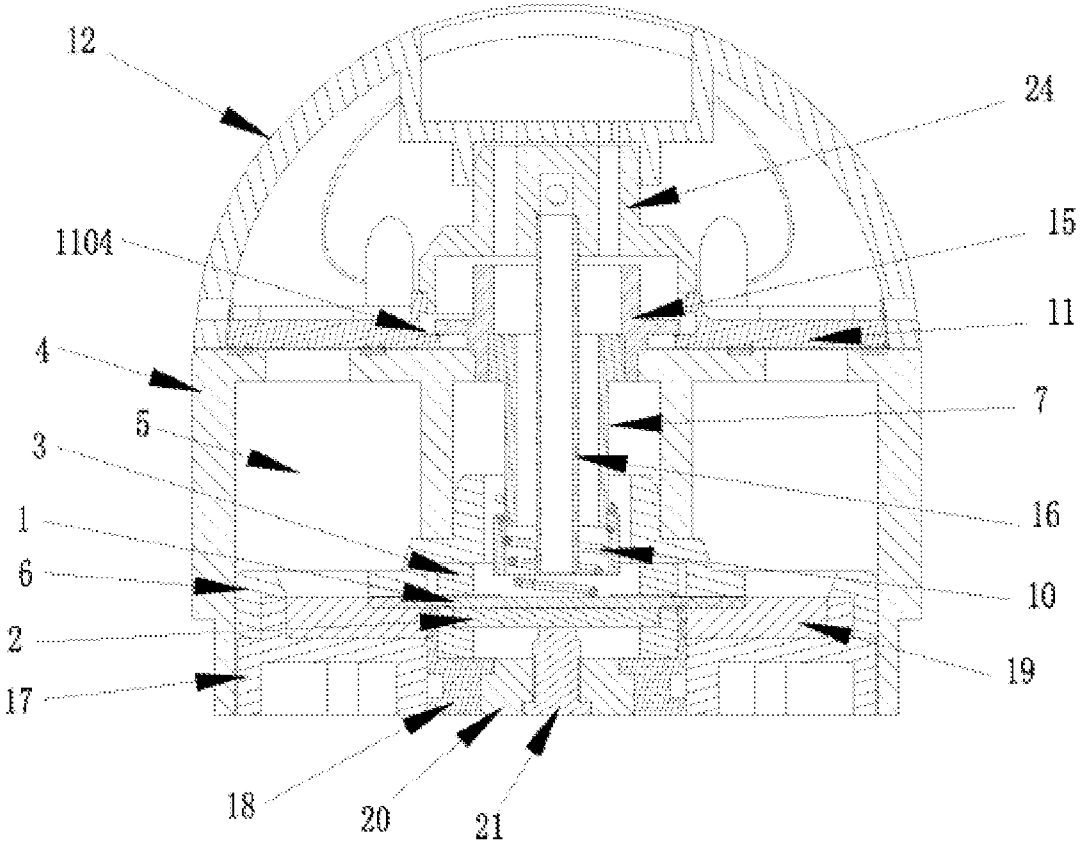
FIG. 16 is a schematic structural diagram of a third embodiment of an atomizer.
Figure 17:
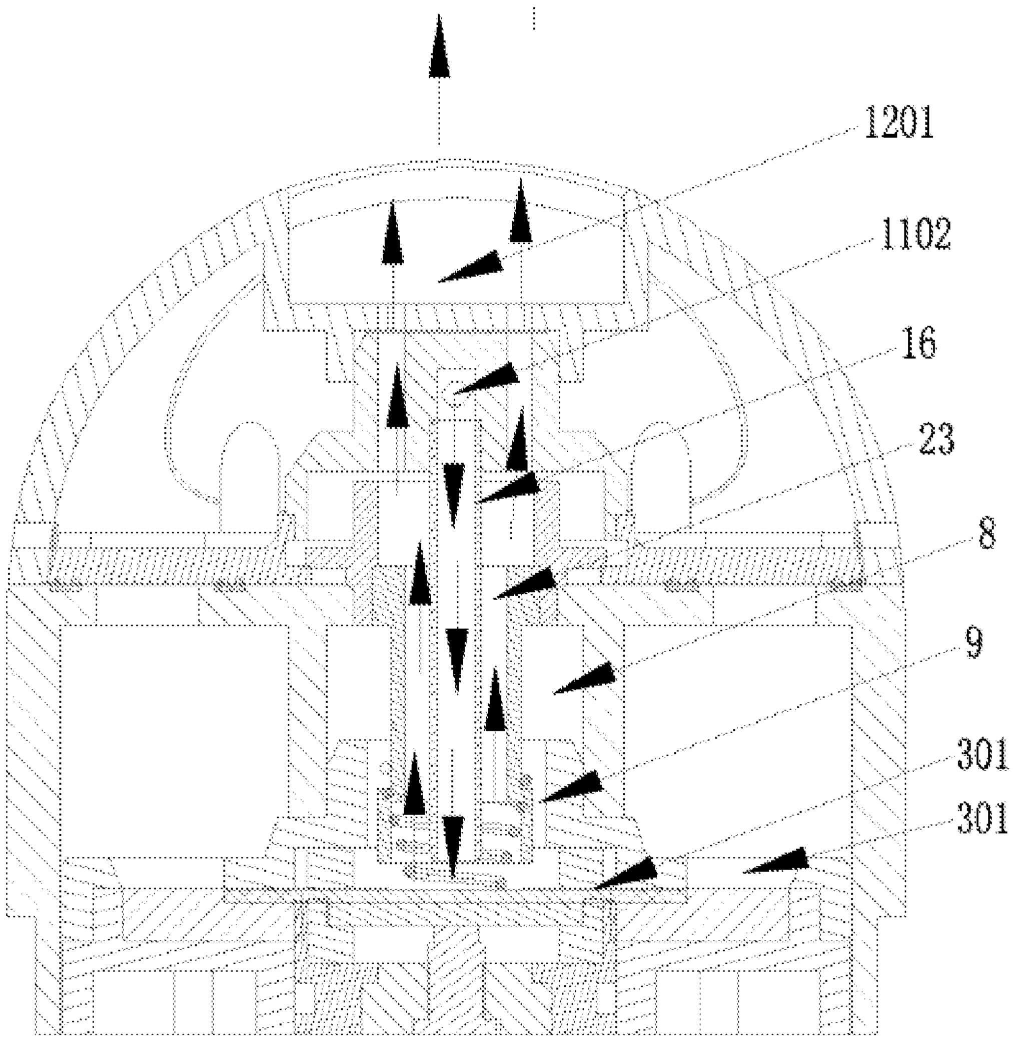
FIG. 17 is a schematic diagram of an air path of the third embodiment of the atomizer.
Figure 18:
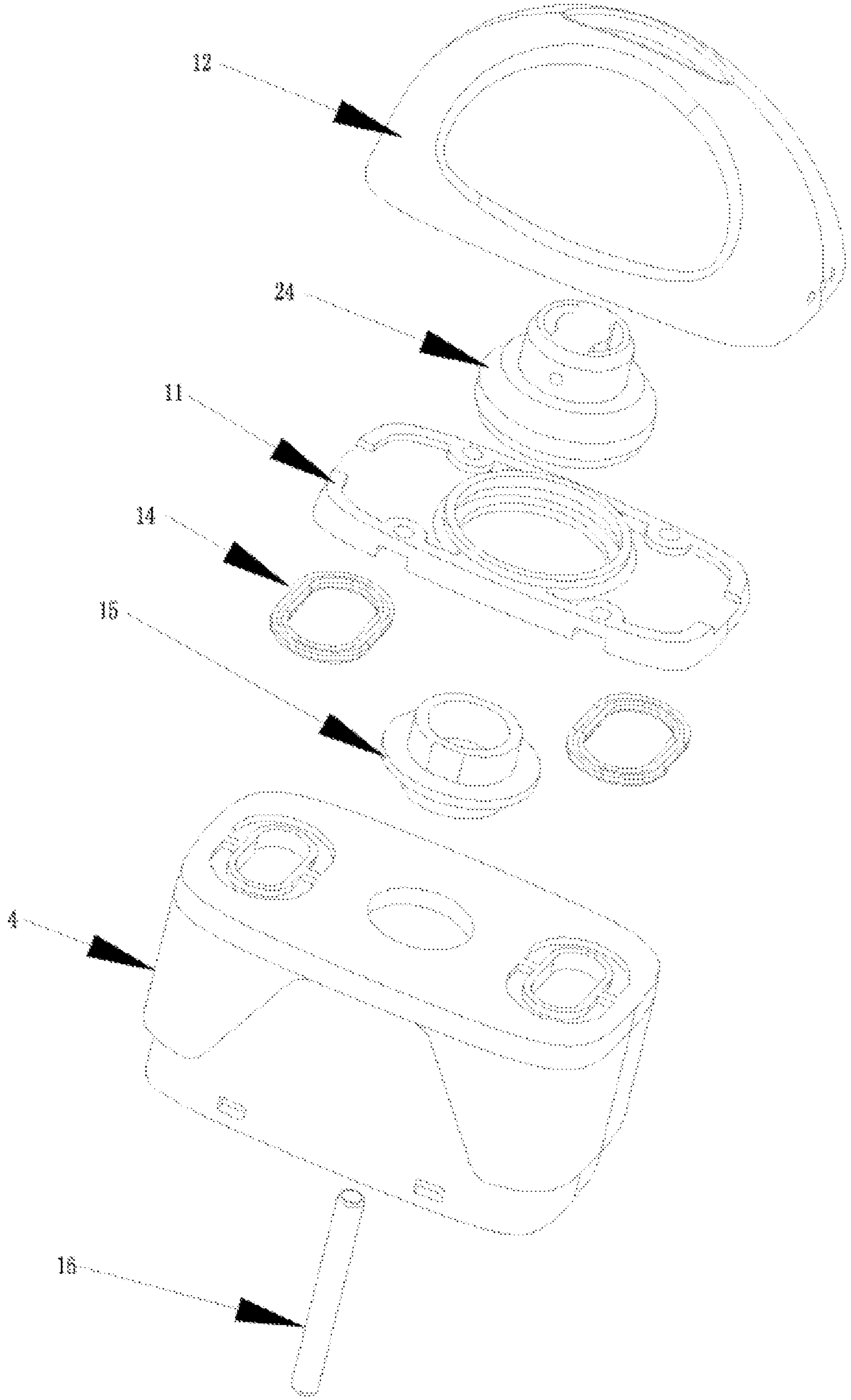
FIG. 18 is an exploded view of the upper part in FIG. 16.
Figure 19:
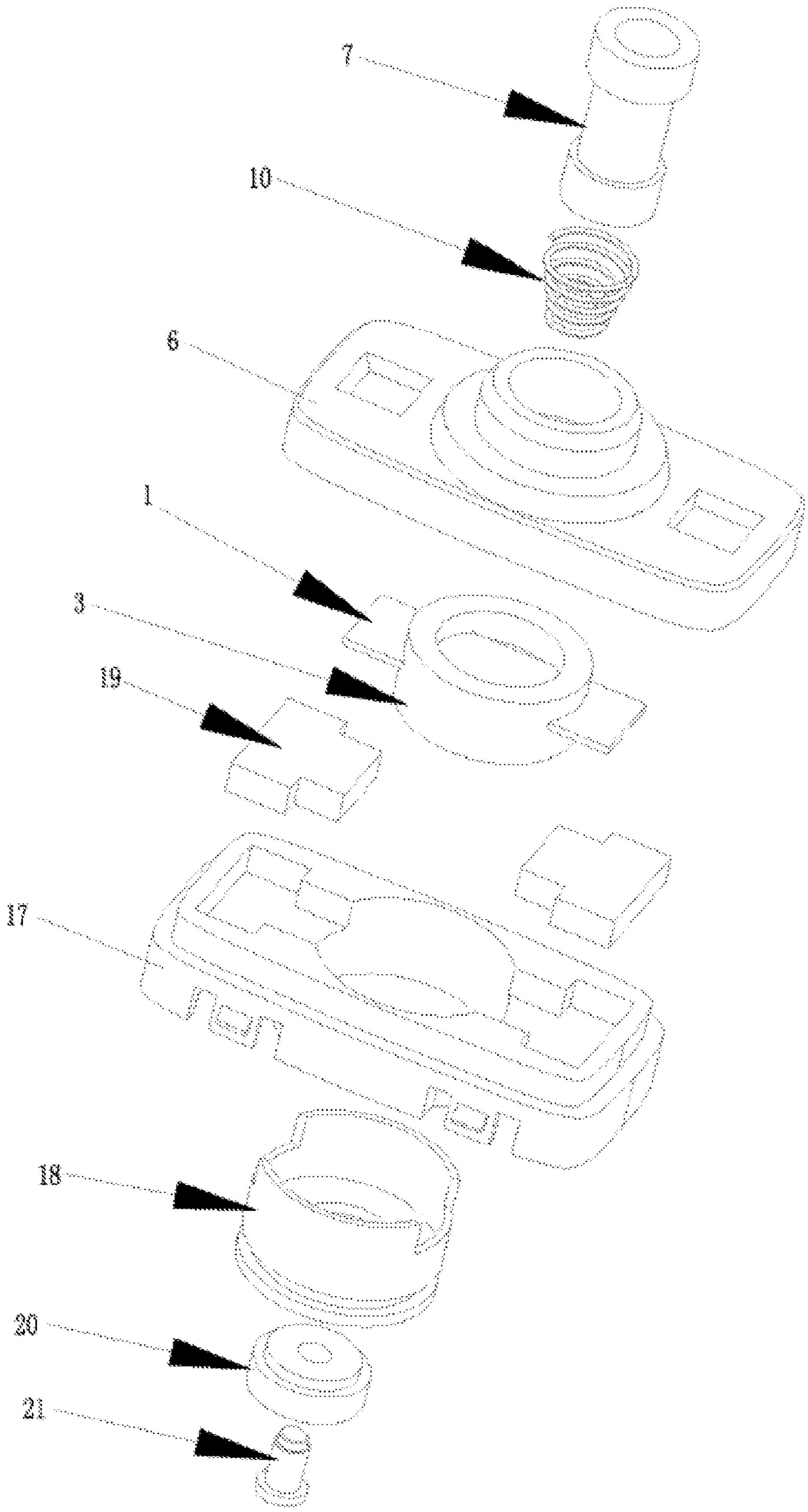
FIG. 19 is an exploded view of the lower part in FIG. 16.
Figure 20:
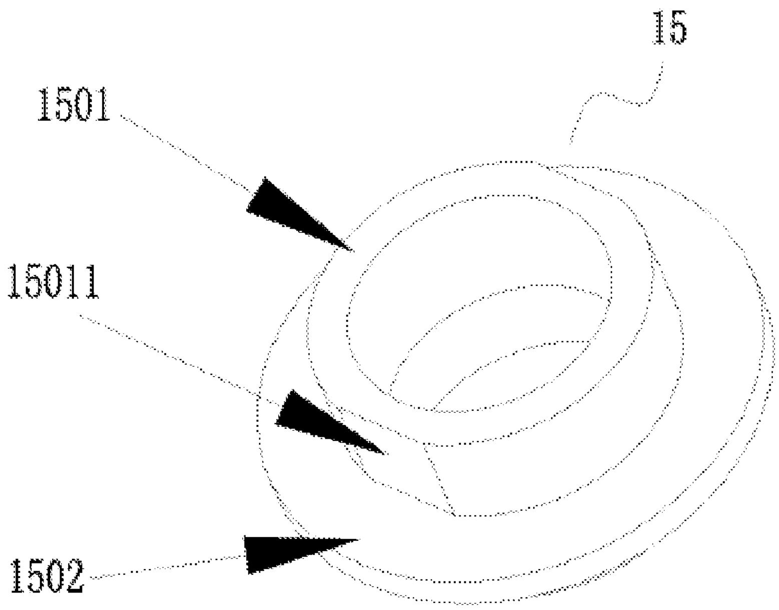
FIG. 20 is a schematic diagram of a first embodiment of a limit ring.

As shown in FIGS. 16 and 17, in the third embodiment of the present invention, since the atomizing seat 3 is arranged between the ring electrode 18 and the atomizing upper cover 6, the through hole 301 on the atomizing seat 3 can be squeezed by pushing the ring electrode 18 upward to adjust the e-liquid guide rate of the e-liquid guide member 1.

The rotating assembly 13 further comprises a mouthpiece base 11 and a mouthpiece cover 12, the mouthpiece base 11 is fixed around the limit ring 15, and the mouthpiece cover 12 is fixed on a top of the mouthpiece base 11. The limit ring 15 is fixed on the shell 4, and a clamping portion 1502 of the limit ring 15 is clamped on a clamping table 1104 of the mouthpiece base 11 to prevent the limit ring 15 from falling out of the mouthpiece base 11.

The mouthpiece cover 12, the mouthpiece base 11, and the lock ring 24 are fixedly connected together by means of riveting or the like to form a rotating assembly 13. When the mouthpiece cover 12 is rotated, the lock ring 24 can be rotated to facilitate the opening of the e-liquid filling hole 402.

A sealing ring 14 is arranged at the e-liquid filling hole 402. When the rotating assembly 13 rotates and opens or closes the e-liquid filling hole 402, the mouthpiece base 11 always abuts against an edge of the sealing ring 14. When e-liquid is filled, the mouthpiece cover 12 is rotated to drive the rotating assembly 13 to open the e-liquid filling hole 402. During the process of rotating the mouthpiece cover 12, the edge of the mouthpiece base 11 presses the edge of the sealing ring 14 all the time, so that the sealing ring 14 does not fall off or wrinkle and deform during the rotation of the rotating assembly 13, which facilitates the adding of e-liquid and improves the sealing performance.

The shell 4 is provided with limit ribs, and the sealing ring 14 is provided with limit slots matched with the limit ribs (the limit ribs and the limit slots are not shown in the drawings, but it does not affect the understanding and implementation of the present invention by those skilled in the art), thereby preventing the sealing ring 14 from being taken out or shifted and deformed when the rotating assembly 13 is rotated, and ensuring sealing performance.

The atomizer further comprises an air tube 16, one end of the air tube 16 is fixedly connected to the mouthpiece base 11, and the other end of the air tube 16 extends into the support 7 and is opposite to the atomizing surface of the atomizing sheet 2. The air outlet channel 23 is formed between the air tube 16 and the support 7. The mouthpiece base 11 is provided with an air inlet 1102, and the mouthpiece cover 12 is provided with an air outlet 1201. As shown in FIG. 17, the air inlet 1102, the air tube 16, the atomizing surface of the atomizing sheet 2, the air outlet channel 23, and the air outlet 1201 are communicated in sequence.

As shown in FIGS. 9 and 24 to 29, the operation process of the child lock of the present invention is as follows:

In the initial state, that is, in the smoking state, the limit ring 15 is at the central axis of the lock ring 24, and the first limit surface 15011 of the limit ring 15 and the second limit surface 24012 of the lock ring 24 are clamped to each other, so that the mouthpiece cover 12 cannot rotate.

In the first state of e-liquid filling, the mouthpiece cover 12 slides along a tangential direction where the mouthpiece cover 12 is connected to the shell 4, until the extension portion 1501 of the limit ring 15 is clamped in the rotating cavity 24011 of the lock ring 24. At this time, the second limit surface 24012 of the lock ring 24 is released from the limiting effect of the first limit surface 15011 of the limit ring 15 and unlocked, and the e-liquid filling hole 402 is still in a closed state.

In the second state of e-liquid filling, after the first limit surface 15011 of the limit ring 15 is misaligned and unlocked with the second limit surface 24012 of the lock ring 24, the mouthpiece cover 12 can be rotated to open the e-liquid filling hole 402 for filling e-liquid into the e-liquid compartment 5, and e-liquid can be filled at this time. When the e-liquid filling hole 402 is opened, the first limit surface 15011 of the limit ring 15 is not aligned with the second limit surface 24012 of the lock ring 24, so the mouthpiece cover 12 cannot slide, which prevents mistaken sliding to affect the e-liquid filling effect.

After the e-liquid is filled, the mouthpiece cover 12 is rotated to close the e-liquid filling hole 402, and finally the rotating assembly 13 is slid and reset to lock the mouthpiece cover 12 so as to prevent the rotation of the rotating assembly 13.

Embodiment of Electronic Cigarette

Figure 30:
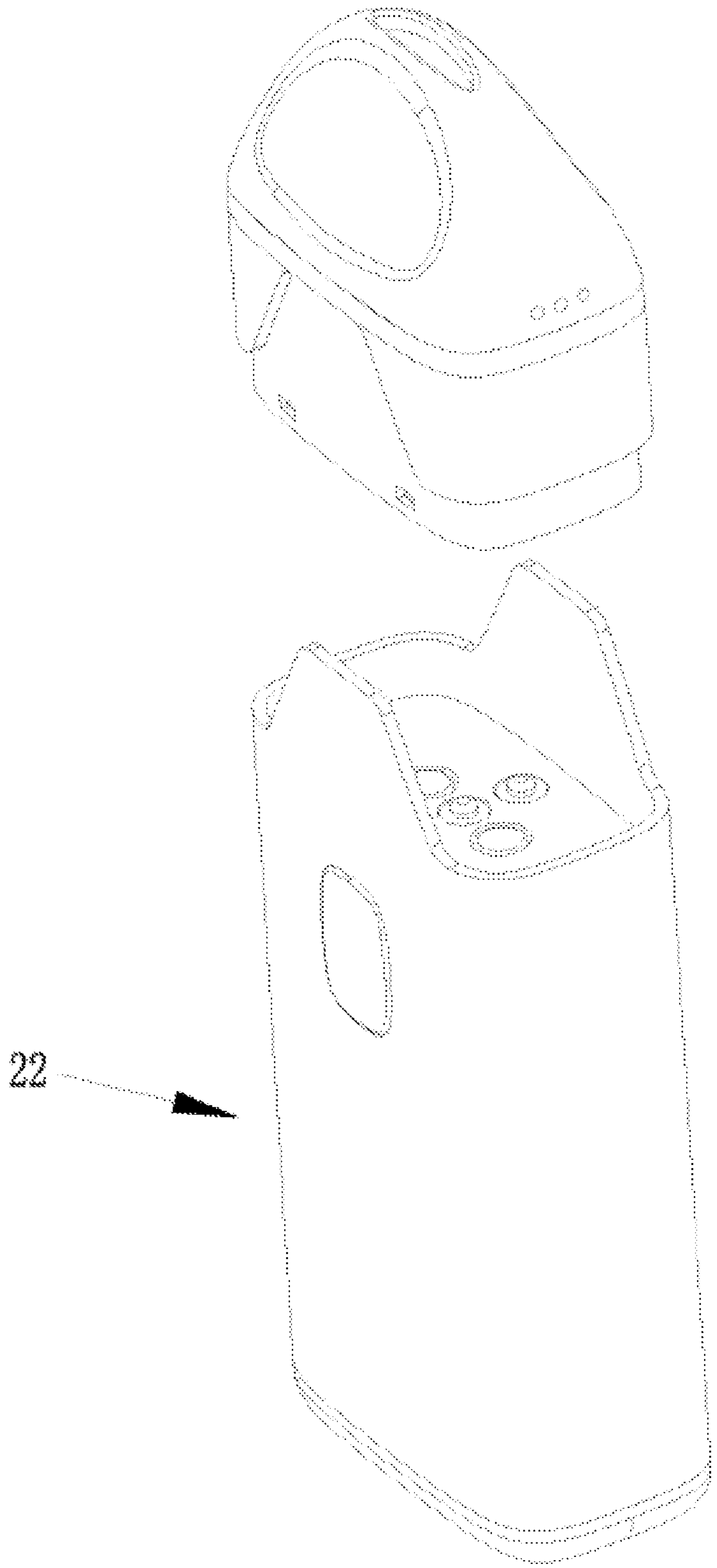
FIG. 30 is a schematic diagram of assembling of the atomizer and a power supply unit.

As shown in FIG. 30, the atomizer and a power supply unit 22 are assembled to form an electronic cigarette. The atomizer is detachably connected to the power supply unit 22, and the power supply unit 22 is electrically connected to the atomizing sheet 2.

The embodiments of the present invention are described above with reference to the drawings, but the present invention is not limited to the specific embodiments. The specific embodiments described above are merely illustrative but not restrictive. Many forms may also be made by those of ordinary skill in the art under the enlightenment of the present invention without departing from the purpose of the present invention and the scope of the claims, and these forms fall into the scope of the present invention.

The invention claimed is:

1. An atomizer, comprising:

a shell (4) in which an e-liquid compartment (5) is arranged, an atomizing sheet assembly, wherein the atomizing sheet assembly comprises:

an e-liquid guide member (1), an atomizing sheet (2), and an atomizing seat (3), wherein:

the atomizing sheet (2) is fixed on the atomizing seat (3), and the e-liquid guide member (1) is in contact with an atomizing surface of the atomizing sheet (2);

the atomizing seat (3) is made of an elastic material;

the e-liquid guide member (1) is flaky, the atomizing seat (3) is provided with a through hole (301), and the flaky e-liquid guide member (1) passes through the through hole (301) and is in contact with the atomizing sheet (2);

wherein an atomizing upper cover (6) is arranged at a bottom of the shell (4), and the atomizing upper cover (6) is provided with an e-liquid outlet (601) communicating the e-liquid compartment (5) with the e-liquid guide member (1);

wherein an atomizing bottom cover (17) is further arranged at a bottom of the atomizing upper cover (6), and the atomizing seat (3) is fixed on the atomizing bottom cover (17) through a ring electrode (18); wherein a support (7) is further arranged above the atomizing seat (3), one end of the support (7) is in contact with the atomizing seat (3); which is characterized in that either the ring electrode (18) or the support (7) is movable in an axial direction of the shell to squeeze the e-liquid guide member (1).

2. The atomizer according to claim 1, wherein:

the support (7) and a cavity (8) are further arranged in the shell (4), one end of the support (7) is fixedly connected to the shell (4), another end of the support (7) passes through the atomizing upper cover (6) and is opposite to the atomizing surface of the atomizing sheet (2), and a gap (9) communicating the e-liquid guide member (1) with the cavity (8) is formed between an outer wall of the support (7) and an inner wall of the atomizing upper cover (6); and an air outlet channel (23) of the atomizer is arranged in the support (7).

3. The atomizer according to claim 2, further comprising a spring (10), wherein one end of the spring (10) is connected to the support (7), and another end of the spring (10) abuts against the e-liquid guide member (1).

4. The atomizer according to claim 1, further comprising a mouthpiece base (11) detachably connected to a top of the shell (4), wherein the top of the shell (4) is provided with an inserting portion (401), and the mouthpiece base (11) is provided with an inserted portion (1101) corresponding to the inserting portion (401).

5. The atomizer according to claim 4, further comprising a mouthpiece cover (12), and wherein:

the mouthpiece cover (12) is fixedly connected to the mouthpiece base (11) and forms a rotating assembly (13) rotatable around the inserting portion (401);

the inserting portion (401) is arranged at a central axis of the shell (4);

the shell (4) is further provided with an e-liquid filling hole (402) for filling e-liquid into the e-liquid compartment (5), and a sealing ring (14) is arranged at the e-liquid filling hole (402); and when the rotating assembly (13) rotates around the inserting portion (401) and opens or closes the e-liquid filling hole (402), the mouthpiece base (11) always abuts against an edge of the sealing ring (14).

6. The atomizer according to claim 1, further comprising a mouthpiece base (11) detachably connected to a top of the shell (4), wherein:

the mouthpiece base (11) is fixedly connected to the mouthpiece cover (12) and forms a rotating assembly (13) rotatable about the axis of the shell (4); and the one end of the support (7) has a squeezing portion (701) corresponding to the through hole (301), another end face of the support (7) has an abutting portion (702) that abuts against the mouthpiece base (11), and the mouthpiece base (11) has concave-convex surfaces (1103) corresponding to the abutting portion (702).

7. The atomizer according to claim 1, wherein:

the support (7) is provided with guide slots (703) for guiding axial movement of the support (7), and guide raised ribs used to prevent circumferential rotation of the support (7) are arranged in the shell (4), and the guide raised ribs are connected with the guide slots (703).

8. The atomizer according to claim 6, wherein:

the shell (4) is provided with an e-liquid filling hole (402) for filling e-liquid into the e-liquid compartment (5); and when the rotating assembly (13) is rotated to open the e-liquid filling hole (402), the rotating assembly (13) drives the support (7) to move toward the atomizing seat (3) and squeeze the through hole (301).

9. The atomizer according to claim 1, wherein:

the shell (4) is provided with an e-liquid filling hole (402) for filling e-liquid into the e-liquid compartment (5);

a top of the shell (4) is provided with a rotating assembly (13) capable of opening or closing the e-liquid filling hole (402), a limit ring (15) is fixed on the shell (4), the limit ring (15) has a cylindrical extension portion (1501);

the rotating assembly (13) comprises a lock ring (24), the lock ring (24) has an accommodating cavity (2401), and the accommodating cavity (2401) has a rotating cavity (24011) matched with the extension portion (1501);

the atomizer further comprises an unlocking mechanism capable of locking or unlocking the connection relationship between the lock ring (24) and the limit ring (15); and when the unlocking mechanism unlocks the connection relationship between the lock ring (24) and the limit ring (15), the extension portion (1501) is placed in the rotating cavity (24011), and the rotating assembly (13)

rotates around the extension portion (1501) and opens the e-liquid filling hole (402).

10. The atomizer according to claim 9, wherein the unlocking mechanism comprises:

a first limit surface (15011) arranged on an outer wall of the extension portion (1501), and a second limit surface (24012) arranged on an inner wall of the accommodating cavity (2401) and matched with the first limit surface (15011).

11. The atomizer according to claim 9, wherein the unlocking mechanism comprises:

a first raised rib (15012) on an outer wall of the extension portion (1501), and a groove (24014) enclosed by two second raised ribs (24013) arranged on an inner wall of the accommodating cavity (2401) and matched with the first raised rib (15012).

12. The atomizer according to claim 9, wherein the rotating assembly (13) further comprises a mouthpiece base (11) and a mouthpiece cover (12), wherein the mouthpiece base (11) is fixed around the limit ring (15), and the mouthpiece cover (12) is fixed on a top of the mouthpiece base (11).

13. The atomizer according to claim 8, wherein:

a sealing ring (14) is arranged at the e-liquid filling hole (402); and when the rotating assembly (13) rotates and opens or closes the e-liquid filling hole (402), the mouthpiece base (11) always abuts against an edge of the sealing ring (14).

14. An electronic cigarette, comprising a power supply unit (22), wherein the electronic cigarette further comprises the atomizer according to claim 1, wherein:

the atomizer is detachably connected to the power supply unit (22), and the power supply unit (22) is electrically connected to the atomizing sheet (2).

15. The atomizer according to claim 1, wherein the through hole (301) comprises an upper hole surface (3011) and a lower hole surface (3012), and the lower hole surface (3012) is flush with or higher than or lower than the atomizing surface of the atomizing sheet (2).

16. The atomizer according to claim 6, wherein:

the support (7) is provided with guide slots (703) for guiding axial movement of the support (7), and guide raised ribs used to prevent circumferential rotation of the support (7) are arranged in the shell (4), and the guide raised ribs are connected with the guide slots (703).

17. The atomizer according to claim 12, wherein:

a sealing ring (14) is arranged at the e-liquid filling hole (402); and when the rotating assembly (13) rotates and opens or closes the e-liquid filling hole (402), the mouthpiece base (11) always abuts against an edge of the sealing ring (14).

* * * * *